US007136357B2

(12) United States Patent
Soumiya et al.

(10) Patent No.: US 7,136,357 B2
(45) Date of Patent: Nov. 14, 2006

(54) TRANSMISSION PATH CONTROLLING APPARATUS AND TRANSMISSION PATH CONTROLLING METHOD AS WELL AS MEDIUM HAVING TRANSMISSION PATH CONTROLLING PROGRAM RECORDED THEREON

(75) Inventors: Toshio Soumiya, Kawasaki (JP); Koji Nakamichi, Kawasaki (JP); Kenya Takashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1112 days.

(21) Appl. No.: 09/797,419

(22) Filed: Mar. 1, 2001

(65) Prior Publication Data

US 2001/0037401 A1 Nov. 1, 2001

(30) Foreign Application Priority Data

Mar. 1, 2000 (JP) ............................. 2000-056254
Dec. 11, 2000 (JP) ............................. 2000-376615

(51) Int. Cl.
*H04J 3/16* (2006.01)

(52) U.S. Cl. .................................................. 370/236

(58) Field of Classification Search ................ 370/230, 370/230.1, 231–239, 395.5, 465, 466, 447, 370/351, 352, 401, 468, 461, 462, 444
See application file for complete search history.

(56) References Cited

U.S. PATENT DOCUMENTS

| 6,363,319 | B1 * | 3/2002 | Hsu ............................. 701/202 |
| 6,473,404 | B1 * | 10/2002 | Kaplan et al. ................ 370/238 |
| 6,529,958 | B1 * | 3/2003 | Oba et al. .................... 709/237 |
| 6,563,793 | B1 * | 5/2003 | Golden et al. ............... 370/236 |
| 6,628,649 | B1 * | 9/2003 | Raj et al. ..................... 370/360 |
| 6,650,640 | B1 * | 11/2003 | Muller et al. ................ 370/392 |
| 6,665,273 | B1 * | 12/2003 | Goguen et al. .............. 370/252 |
| 6,687,230 | B1 * | 2/2004 | Furutono et al. ............ 370/238 |

FOREIGN PATENT DOCUMENTS

JP 2001-024699 1/2001

OTHER PUBLICATIONS

Cao, Wang, Zegura: "Hashing based traffic splitting algorithms for internet load balancing" University Technical Report GIT-CC-99/14, (May 1999), XP002272966 . . . .
Li, Swallow, Awduche: "IGP requirements for traffic engineering with MPLS" IETF Network Working Group Draft, (Feb. 1999), XP002272967 . . . .
Takashima K et al.: "Concept of IP Traffic I-77 Engineering" IETF, Online, (Oct. 1999), XP002258997 . . . .
Crawley, Nair, Rajagopalan, Sandick: "A framework for QOS based routing in the internet RFC 2386" . . . .

(Continued)

Primary Examiner—Dang T. Ton
(74) Attorney, Agent, or Firm—Katten Muchin Rosenman LLP

(57) ABSTRACT

The present invention relates to distributing the load between the set routes among a plurality of routes between a communication apparatus which serves as a start point to another communication apparatus which serves as an end point. An apparatus provided in a router in a network collects traffic characteristics of transmission paths connected to the router, notifies other routers of the collected traffic characteristics, calculates load based on the collected traffic characteristics, decides based on the calculated load information whether or not a transmission path should be added or deleted, and equalizes the load among the plurality of transmission paths.

98 Claims, 12 Drawing Sheets

OTHER PUBLICATIONS

Wei Sun: "QoS Policy Constraint based routing" online, (Dec. 1, 1999), XP002288847 . . . .

Indra Widjaja et al: "Mate: MPLS Adaptive Traffic Engineering" IETF Draft, (Oct. 1999), XP002248984 . . . .

Zheng Wang et al: "Quality-of-Service Routing for Supporting Multimedia Applications" IEEE Journal on Selected Areas in Communications, IEEE Inc. New York, US vol. 14, No. 7, Sep. 1, 1996 . . . .

Rosen E C et al: "Multiprotocol Label Switching Architecture" IETF RFC, (Aug. 1999), XP002195041 . . . .

Awduche D et al: "Requirements for Traffic Engineering Over MPLS (RFC 2702)" IETF, online (Sep. 1999), XP002185031 . . . .

Kompella, Rekhter: "Link Bundling in MPLS I-77 traffic engineering draft-kompella-mpls-bundla-00.txt" IETF Networking Group Draft, (Feb. 2000), XP002272965 . . . .

* cited by examiner

| LABEL (20BITS) | RESERVED (3BITS) | S (1BIT) | TTL (8BITS) |

4 OCTETS

TRANSMISSION PATH CONTROLLING APPARATUS AND TRANSMISSION PATH CONTROLLING METHOD AS WELL AS MEDIUM HAVING TRANSMISSION PATH CONTROLLING PROGRAM RECORDED THEREON

BACKGROUND OF THE INVENTION

1. Field of the Invention

This invention relates to a transmission path controlling apparatus provided in a communication apparatus (for example, a router or load equalization apparatus) which forms an network, and further to a transmission path controlling method executed by the apparatus as well as a medium on which a transmission path controlling program used in the apparatus is recorded. The method and apparatus may be provided within, for example, an Internet Protocol network (in the following description an Internet Protocol is sometimes referred to simply as IP; accordingly, an Internet Protocol network is referred to simply as IP network).

2. Description of the Related Art

The Internet is intended to handle all communication applications on the internet protocol and is being popularized rapidly at present. Further, the Internet originally has a connectionless network architecture which does not involve establishment of a connection, and is routed to an outgoing path based on a destination address described in an IP packet. In short, in a communication apparatus having the function described, at a point of time when an IP packet arrives at the apparatus, the IP packet is merely transferred to an outgoing path which corresponds to the IP address.

In the Internet having such a network architecture as described above, in order to determine to which outgoing path each IP address should be transferred, a protocol for path determination called routing protocol is handled between communication apparatus.

At present, as an algorithm for the routing protocol, a system which employs the algorithm of Dijkstra is commonly used. However, the routing protocol mentioned has a problem in that a plurality of routes to a destination cannot be selected or the routing protocol is executed only when the network topology varies.

In short, with such a technique as described above, once a route is established, an IP packet is transferred only along the route, and as a result, there is the possibility that chronic congestion occurs.

Further, such a technique as described above has a problem also in that, since a plurality of routes cannot be set, when a certain route suffers from congestion, even if some other route is unoccupied, this unoccupied route cannot be used.

Thus, the following techniques have been proposed.

(1-1) Equal cost multipath technique in the OSPF (Open Shortest Path First)

(1-2) Multipath technique in the IBGP (Internal Border Gateway Protocol)

In particular, the method according to the technique of (1-1) is a method which uses a function of the OSPF, and uses a function capable of laying a plurality of paths having an equal cost from a communication apparatus which serves as a start point to another communication apparatus which serves as an end point to distribute load among the plurality of paths (multipaths).

Meanwhile, the method according to the technique of (1-2) uses a function of the IBGP to lay a plurality of paths and distribute load among the plurality of paths (multipaths).

However, the method which uses a function of the OSPF according to (1-1) above has the following problems.

In particular, there is a restriction in that the multipaths must be equal in cost, and the degree of freedom in path selection is low. Further, since the OSPF is used, the method cannot cope with a variation of the network load on a real time basis.

Also the method which uses a function of the IBGP according to (1-2) above has a restriction in that the multipaths must be equal in cost and has a problem in that the degree of freedom in path selection is low, similarly to the problems of the method which uses a function of the OSPF.

It is to be noted that also a technique has been proposed wherein a path is set in the layer 3 between data processing apparatus which connect networks to each other and load is distributed in a unit of a route in the layer 3 to dynamically provide a traffic balance to improve the network performance (refer to the official gazette of Japanese Patent Laid-Open No. HEI 10-224400). With the technique, however, even if a traffic balance can be provided between networks, load distribution in each network cannot be performed. Further, only load distribution in the layer 3 and in a unit of a route is taken into consideration, and there is the possibility that load distribution control may be complicated.

SUMMARY OF THE INVENTION

The present invention has been made in view of such problems as described above, and it is an object of the present invention to provide a transmission path controlling apparatus and a transmission path controlling method as well as a medium on which a transmission path controlling program is recorded, wherein a plurality of routes (transmission paths) from a communication apparatus (source communication apparatus) which serves as a start point to another communication apparatus (destination communication apparatus) which serves as an end point from among communication apparatus in a network such that load can be distributed among the set routes so as to allow traffic engineering in a network such as the Internet irrespective of the network topology and without depending upon the type of the transmission paths.

FIGS. 1(a), 1(b) and 1(c) are explanatory views of a principle of the present invention. First, a transmission path controlling apparatus according to the present invention is used with such a network as shown in FIG. 1(a), the network includes a source communication apparatus (an origination communication apparatus) 1S, a destination communication apparatus 1D, a plurality of transmission paths 2-$i$ ($i=1$ to N:N is a natural number) capable of being set between the source communication apparatus 1S and the destination communication apparatus 1D, and a intermediate communication apparatus 1R interposed in any one of the transmission paths 2-$i$, and provided in one of the communication apparatus 1S, 1D and 1R which form the network (in the following description, where the source communication apparatus 1S, destination communication apparatus 1D and intermediate communication apparatus 1R are represented without specific distinction among them, they are referred to merely as communication apparatus 1, and the network is an IP network for example).

The transmission path controlling apparatus (the source communication apparatus 1S and the destination communication apparatus 1D) according to the present invention includes, as shown in FIG. 1(b), a traffic characteristic collection section 3, a traffic characteristic notification section 4, a load calculation section 5, a decision section 6 and a load equalization section 7.

Here, the traffic characteristic collection section 3 collects traffic characteristics of those of the transmission paths 2-i connected to the communication apparatus 1 or the other communication apparatus. The traffic characteristic collection section 3 includes a traffic characteristic collection section 3A for collecting traffic characteristics at the communication apparatus 1 itself, and a traffic characteristic reception section 3B for receiving traffic characteristics notified of from the other communication apparatus.

The traffic characteristic notification section 4 notifies the other communication apparatus of the traffic characteristics collected by the traffic characteristic collection section 3 (particularly 3A).

The load calculation section 5 calculates load based on the traffic characteristics collected by the traffic characteristic collection section 3.

The decision section 6 discriminates whether or not a transmission path should be added or deleted based on the load information determined by the load calculation section 5, and the load equalization section 7 equalizes the load determined by the load calculation section 5 among the plurality of transmission paths.

The transmission path controlling apparatus (the intermediate communication apparatus 1R) according to the present invention includes, as shown in FIG. 1(c), a traffic characteristic collection section 3 and a traffic characteristic notification section 4.

Here, the traffic characteristic collection section 3 collects traffic characteristics of those of the transmission paths 2-i connected to the communication apparatus 1 or the other communication apparatus. The traffic characteristic collection section 3 includes a traffic characteristic collection section 3A for collecting traffic characteristics at the communication apparatus 1 itself, and a traffic characteristic reception section 3B for receiving traffic characteristics notified of from the other communication apparatus.

The traffic characteristic notification section 4 notifies the other communication apparatus of the traffic characteristics collected by the traffic characteristic collection section 3 (3A and 3B).

It is to be noted that, while it is possible to provide the transmission path controlling apparatus, which is provided in each of the source communication apparatus 1S, destination communication apparatus 1D and intermediate communication apparatus 1R, with such a traffic characteristic collection section 3, traffic characteristic notification section 4, load calculation section 5, decision section 6 and load equalization section 7 as described above, it is possible to provide the transmission path controlling apparatus, which is provided in the source communication apparatus 1S, with the traffic characteristic collection section 3, traffic characteristic notification section 4, load calculation section 5, decision section 6 and load equalization section 7 and provide, as shown in FIG. 1(c) the transmission path controlling apparatus, which is provided in each of the destination communication apparatus 1D and the intermediate communication apparatus 1R other than the source communication apparatus 1S, only with the traffic characteristic collection section 3 and traffic characteristic notification section 4.

It is to be noted that the traffic characteristic collection section 3 may have means for smoothing the collected traffic characteristic values, or may have means for determining a maximum value of the collected traffic characteristic values as a representative value of the traffic characteristic values.

Further, the traffic characteristic notification section 4 may have means for notifying (providing) the information regarding the traffic characteristics making use of a packet provided by a routing protocol, or may have means for notifying the information regarding the traffic characteristics after each of a fixed period, or else may have means for notifying the information regarding the traffic characteristic with a message of the RSVP expanded.

Further, the traffic characteristic collection section 3 may have means for collecting a unit of a flux of flows for collecting traffic characteristics in a unit of a label which is used by a communication apparatus of the label switch type such as MPLS (Multi-Protocol Label Switching).

The traffic characteristic collection section 3 provided in the source communication apparatus 1S may have means for discriminating utilization (a utilization rate) of each of the transmission paths 2-i connected to the source communication apparatus 1S based on an average utilization (an average utilization rate) of the transmission paths 2-i connected to the intermediate communication apparatus 1R collected from the intermediate communication apparatus 1R.

It is to be noted that the traffic characteristic collection section 3 provided in the source communication apparatus 1S may have means for discriminating utilization of each of the transmission paths 2-i connected to the source communication apparatus 1S based on a maximum utilization of the transmission paths 2-i connected to the intermediate communication apparatus 1R collected from the intermediate communication apparatus 1R.

Further, the traffic characteristic collection section 3 provided in the source communication apparatus 1S may have means for discriminating after each fixed period whether or not each of the transmission paths 2-i is in congestion.

The load calculation section 5 provided in the source communication apparatus 1S may have means for calculating effective load taking a number of abandoned packets generated in the intermediate communication apparatus 1R into consideration. In this instance, an effective load calculation unit may be constructed so as to set an upper limit to the effective load when the effective load is to be calculated.

Furthermore, the transmission path controlling apparatus may be constructed such that the load calculation section 5 provided in the source communication apparatus 1S has means for calculating effective load taking a number of abandoned packets generated in the intermediate communication apparatus 1R into consideration, and the decision section 6 provided in the source communication apparatus 1S has means for calculating an effective bandwidth from the effective load obtained by the effective load calculation unit and determining, regarding all of the transmission paths as one virtual pipe, utilization of the virtual pipe.

Further, the transmission path controlling apparatus may be constructed such that the load calculation section provided in the source communication apparatus 1S has means for calculating effective load taking a number of abandoned packets generated in the intermediate communication apparatus 1R into consideration, and the decision section 5 provided in the source communication apparatus 1S has a pipe utilization calculation unit for calculating an effective bandwidth from the effective load calculated by the effective load calculation unit and determining, regarding all of the transmission paths 2-i as one virtual pipe, utilization of the virtual pipe, and comparing the pipe utilization obtained by the pipe utilization calculation unit with a set reference value and determining whether a transmission path is to be added or deleted in accordance with a result of the comparison.

The decision section 6 provided in the source communication apparatus 1S may be constructed so as to add a transmission path when the pipe utilization obtained by the pipe utilization calculation unit is higher than a reference value for addition of a path, or may be constructed so as to delete a transmission path having a low load when the pipe utilization obtained by the pipe utilization calculation unit is lower than a reference value for deletion of a path.

The load equalization section 7 provided in the source communication apparatus 1S may have a move effective bandwidth calculation unit for determining an effective bandwidth to be moved with each of the transmission paths 2-$i$ from an average effective bandwidth calculated for all of the transmission paths 2-$i$ based on an effective bandwidth obtained from effective load obtained taking a number of abandoned packets generated in the intermediate communication apparatus 1R into consideration.

Further, in this instance, the load equalization section 7 provided in the source communication apparatus 1S may distribute packets flowing into the source communication apparatus 1S to the plurality of transmission paths in proportion to the effective bandwidths to be moved calculated by the move effective band calculation unit.

It is to be noted that the load equalization section 7 provided in the source communication apparatus 1S may be constructed so as to perform a calculation using a Hash function based on an address and distribute traffic flows at random based on a result of the calculation.

Then, in the present invention, in a network which includes a source communication apparatus 1S, a destination communication apparatus 1D, a plurality of transmission paths 2-$i$ capable of being set between the source communication apparatus 1S and the destination communication apparatus 1D, and a intermediate communication apparatus 1R interposed in any one of the transmission paths 2-$i$, (A1) a traffic characteristic collection step of collecting traffic characteristics of those of the transmission paths 2-$i$ connected to the other communication apparatus, and (A2) a traffic characteristic notification step of notifying the source communication apparatus 1S of the traffic characteristics collected by the traffic characteristic collection step are performed by communication apparatus other than the source communication apparatus of the network, and (B1) a traffic characteristic collection step of collecting traffic characteristics of those of the transmission paths connected to the source communication apparatus 1S, (B2) a load calculation step of calculating load based on one or both of the traffic characteristics collected by the traffic characteristic collection step and the traffic characteristics obtained from the other communication apparatus, (B3) a determining step of determining whether or not a transmission path should be added or deleted based on the load information determined by the load calculation step, and (B4) a load equalization step of equalizing the load determined by the load calculation step among the plurality of transmission paths may be performed by the source communication apparatus 1S.

Also a medium is disclosed on which a transmission path controlling program for being used by one of the communication apparatus 1 which forms the network shown in FIG. 1($a$) is recorded, the transmission path controlling program causing a computer to function as a traffic characteristic collection unit for collecting traffic characteristics of those of the transmission paths connected to the communication apparatus or the other communication apparatus, traffic characteristic notification unit for notifying the other communication apparatus of the traffic characteristics collected by the traffic characteristic collection unit, load calculation unit for calculating load based on the traffic characteristics collected by the traffic characteristic collection unit, decision section for deciding whether or not a transmission path should be added or deleted based on the load information determined by the load calculation unit, and a load equalization unit for equalizing the load determined by the load calculation unit among the plurality of transmission paths.

BRIEF DESCRIPTION OF THE DRAWINGS

FIG. 1($b$) is an example of an embodiment of the present invention;

FIG. 1($c$) is an example of another embodiment of the present invention.

DESCRIPTION OF THE PREFERRED EMBODIMENTS

In the following, an embodiment of the present invention is described with reference to the drawings.

As an embodiment of the present invention, a case wherein an MPLS router as a router (an example of a communication apparatus) of the label switch type is equipped with the present transmission path controlling apparatus and a route different from a routing protocol is set using the MPLS (Multi-Protocol Label Switching) and using a label function of the MPLS to effect load distribution is described. Here, the MPLS signifies a system which can simply and effectively perform a service which is difficult to realize with a router at present by using a label of the layer 2 in a specialized manner for an IP.

In the following, an outline of the MPLS is described first, and then a load distribution method and a load distribution algorithm (including description of operation) of the MPLS are described.

(2-1) Description of an Outline of the MPLS

Figure 1A:
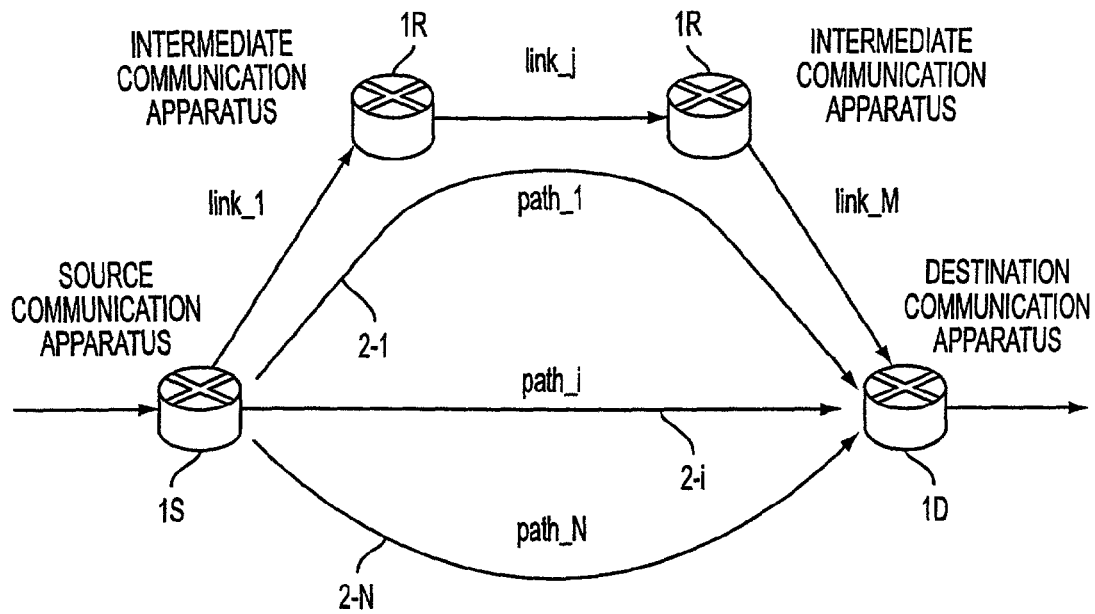
FIG. 1($a$) is an example of a network of the present invention.
Figure 1B:
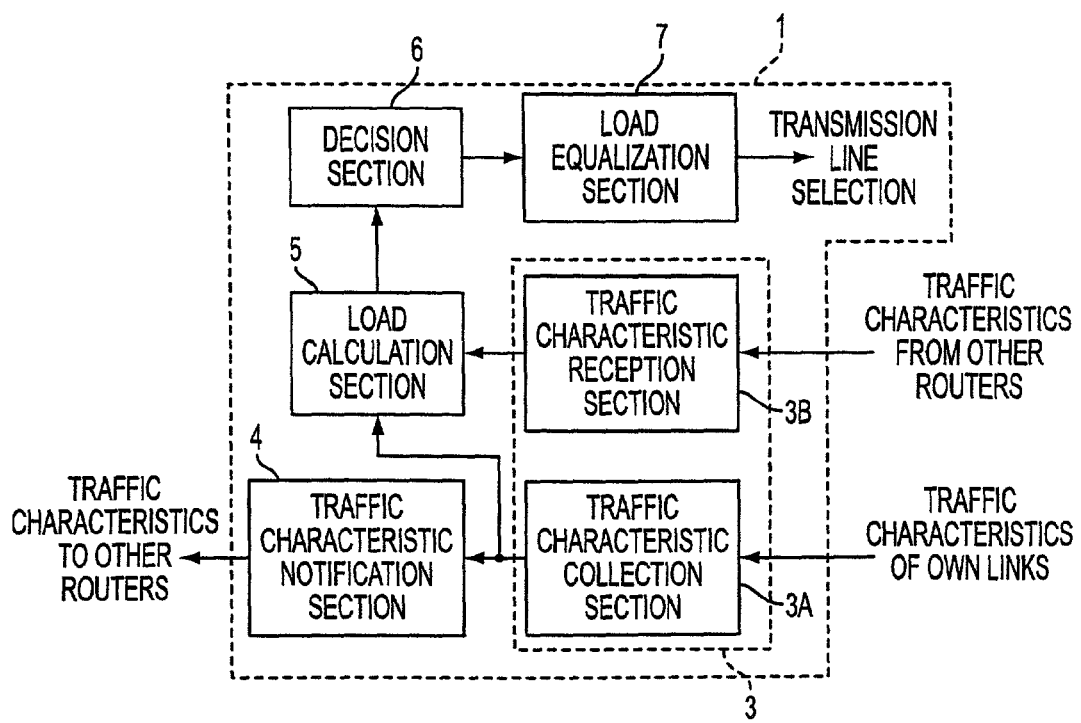
Figure 1C:
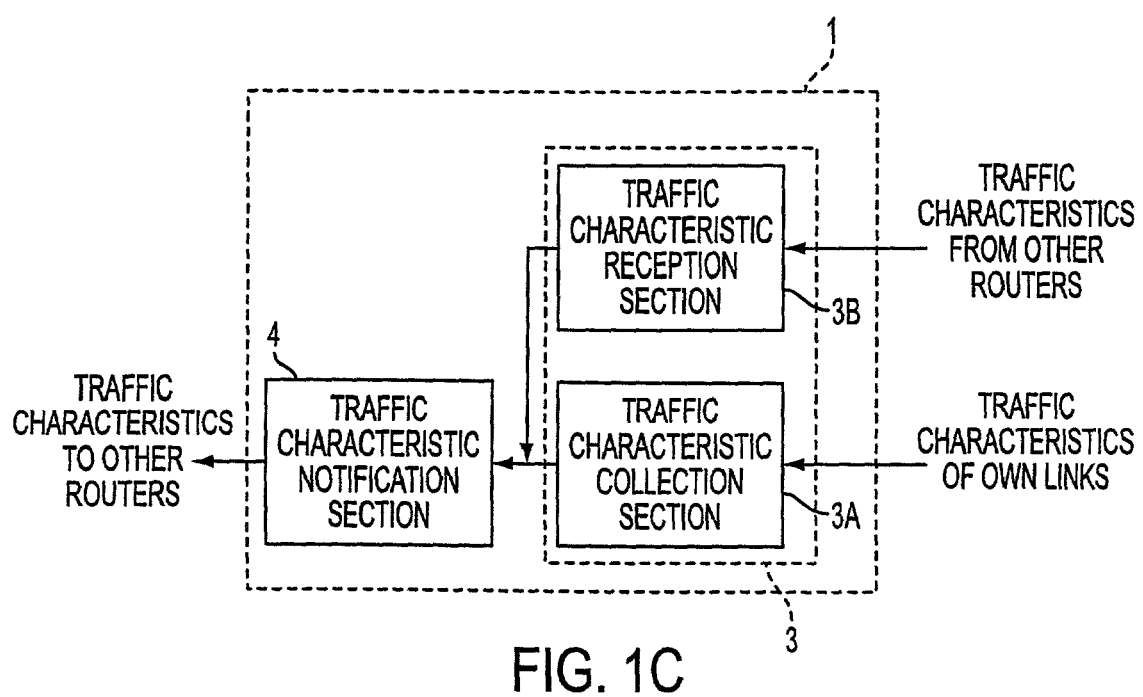
Figure 2A:
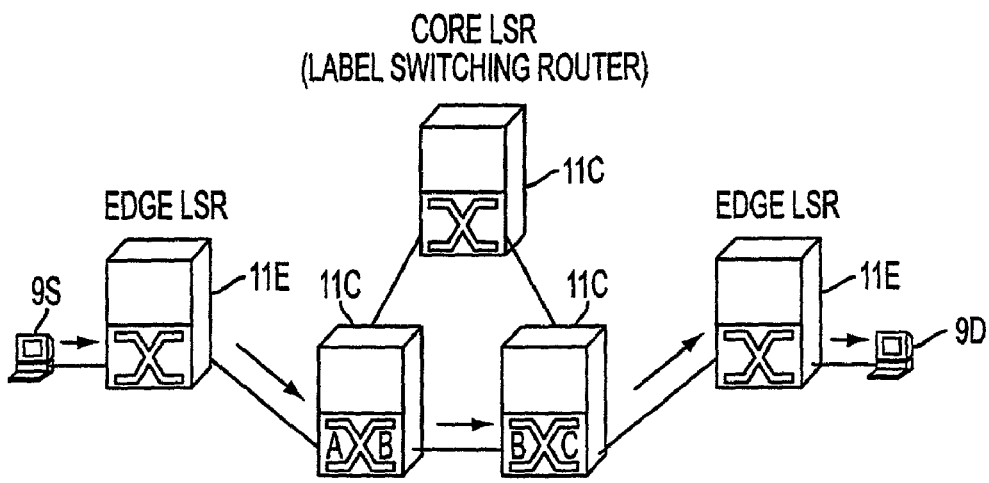
FIGS. 2($a$) and 2($b$) are views for explaining an MPLS network.
Figure 2B:
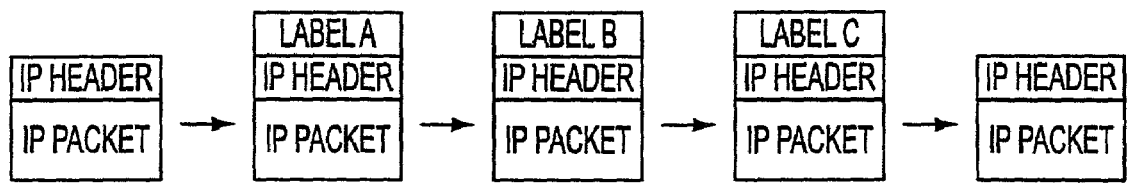

First, an outline of the MPLS is described. FIGS. 2(*a*) and 2(*b*) show a network architecture and a manner of basic packet transfer of the MPLS. An MPLS network is composed of an edge label switching router (Edge Label Switching Router, hereinafter referred to as edge LSR) 11E and a core label switching router (Core Label Switching Router, hereinafter referred to as core LSR) 11C. This is called MPLS domain.

Here, the edge LSR 11E is a router which is positioned on the boundary with an existing internet network and adds a label to a packet to realize a network layer service of a high performance and a high added-value. This edge LSR terminates a LAN interface of an unlabeled frame base (Frame Base).

Meanwhile, the core LSR 11C is a router which exchanges a label of a labeled packet or cell. This core LSR 11C may be constructed so as to support not only label exchange but also layer 3 routing or layer 2 switching.

A protocol which is used in cooperation with a routing protocol of a standard network layer to exchange label information between devices on an internet network by label switching is the label distribution protocol (LDP).

It is to be noted that reference characters 9S and 9D in FIG. 2(*a*) denote each a terminal such as a personal computer.

In such an MPLS network as shown in FIG. 2(*a*), a label coordinated with a path leading to a destination terminal is added to an IP packet arriving in the MPLS domain by an edge LSR 11E. In FIG. 2(*b*), a label A is provided to the IP packet, and the IP packet is transferred to a core LSR 11C. The core LSR 11C looks over only the label and switches the IP packet to an outgoing path corresponding to the label A. When the packet is transferred to the switched outgoing path, a label B is provided newly to the packet. This is called label swapping. In this manner, in the MPLS domain, while label swapping is performed successively, the IP packet is successively transferred toward a target destination terminal 9D in accordance with the label. At the edge LSR 11E at the exit of the MPLS domain, the label is removed and transferred to the MPLS domain.

Subsequently, a label used in the MPLS is described.

First, the two following methods are available to realize the MPLS.

① Method wherein an existing switch is used
② Method wherein a new label is defined The method according to ① wherein an existing switch is used is a method wherein an existing switch such as an asynchronous transfer mode (ATM) or a frame relay (represented also as FR), and in the ATM, a region of a virtual path identifier (VPI) and a virtual channel identifier (VCI) is used as a label, but in the frame relay, the DLCI is used as a label.

In the method according to ② wherein a new label is defined, a newly defined label called "shim header" is used. The shim header is inserted between the layer 3 and the layer 2, and an outline of it is illustrated in FIG. 3.

Figure 3:
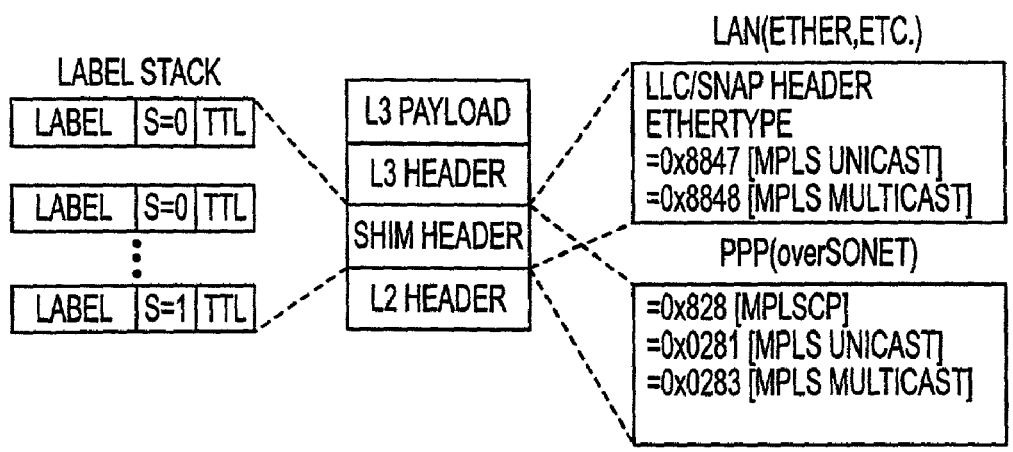
FIG. 3 is a view for explaining a label used in MPLS.

To the shim header, a TTL and a pointer S for a label stack are provided in addition to a label as shown in FIG. 3. The label stack is used for hierarchization of labels, and by using the label stack, it is possible, for example, to hierarchize a plurality of MPLS domains in an MPLS domain to build up a network. In FIG. 3, where S=1, it is recognized that this is the last label.

It is to be noted that, in addition to labels for the ATM/FR, also labels for the PPP over SONET and labels for the ether frame (LAN) are defined (refer to the PPP and the LAN shown on the right side in FIG. 3).

Figures 4, 5:
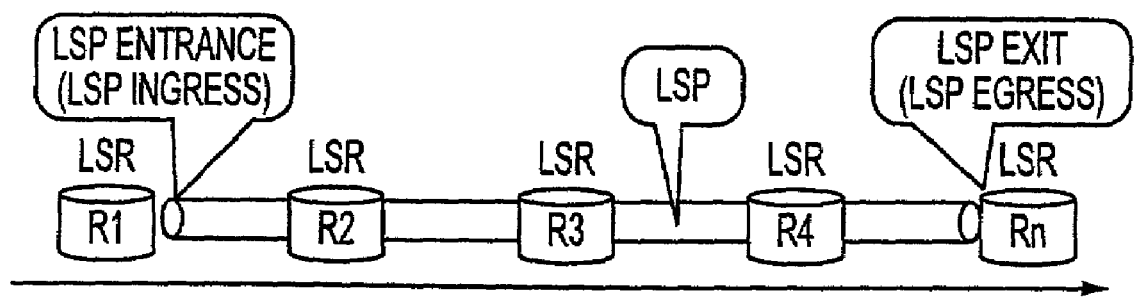
FIG. 4 is a view for explaining the label used in the MPLS.
FIG. 5 is a view for explaining an LSP.

Further, a label has a length of, for example, 4 octets and is indicated as shown in FIG. 4. Such labels can have a hierarchical structure, and the structure is called "label stack". The label and other additional information illustrated in FIG. 4 is sometimes indicated in the MPLS header defined by the MPLS or indicated in the L2 header or the ATM header.

The S (Bottom of Stack) indicated in FIG. 4 is set to 1 where the entry is the last entry positioned at the lowermost position of the label stack, and it is set to 0 for all of the other entries.

Meanwhile, the TTL (Time-to-Live) shown in FIG. 4 represents a field used to encode a TTL and is decremented one by one before a labeled packet is forwarded. A packet whose TTL becomes zero as a result of the decrementing must not be forwarded any more, and in this instance, either the packet is abandoned as it is, or it is handed to processing of the network layer with the label stack removed therefrom. This packet must not be forwarded also after it is handed to the processing of the network layer.

Subsequently, a label switched path (LSP) is described. The LSP signifies a path from an LSR at the entrance to another LSR at the exit, and may pass intermediate LSRs, an example can be seen also from FIG. 5. A label at each LSR is determined in a coordinated relationship with the LSP. While description is hereinafter given, in the present invention, collection of traffic characteristics is performed for each LSP.

Further, a method of establishing an LSP is described.

First, as a method of establishing an LSP, the following two systems have been proposed.

① Method wherein the LDP (Label Distribution Protocol) is used
② Method wherein the RSVP-tunnel is used In the following, a method which uses the RSVP-Tunnel of ② is described.

The LSP-tunnel is executed expanding the conventional RSVP, and the background of this system arises from that, where the MPLS incorporates the RSVP, a flow can be managed with increased flexibility by unifying them.

The LSP-tunnel defines, for the RSVP, the following five new objects [LABEL REQUEST (used in a path message (PATH message)), LABEL (used in a Resv message), EXPLICIT ROUTE (used in a PATH message), RECORD ROUTE (used in a PATH message or a Resv message) and SESSION ATTRIBUTE (used in a PATH message)].

Here, the LABEL REQUEST object is used in a PATH message and is used to determine a label regarding the path by an intermediate router and a reception router. In order to establish a path (=LSP-tunnel), a source LSR produces a PATH message having a LABEL REQUEST, and further, a node which has transmitted the LABEL REQUEST must make preparations for reception of a Resv message corresponding to the PATH message. If a PATH message which does not include a LABEL REQUEST is received, then a LABEL REQUEST object must not be written into the PATH message.

While a LABEL object is used in a Resv message, in the LSP-tunnel, a label is placed in the Resv message and returned to the source. Then, the Resv message is sent back toward the source along a route of the PATH message. Further, each node which receives the Resv message having the LABEL object uses the label as a label of the output side of the LSP-tunnel, and if the node is not the source of the LABEL REQUEST, then the node executes processing of allocating a new label and placing the new label into the LABEL object of the Resv message. Then, the label transmitted to the upstream is used as an input side label of the LSP-tunnel.

An EXPLICIT ROUTE object (ERO) is used in a PATH message. If this object appears in a PATH message, then the PATH message must be transferred along a path explicitly indicated by the ERO. The ERO is intended to be used for explicit routing. The RECORD ROUTE object is used in a PATH message or a Resv message and allows a transmission node to receive information regarding an actual path of the LSP-tunnel. This is similar to a path vector (path vector) and can be used also for detection of a loop.

A SESSION ATTRIBUTE object is used in a PATH message. This SESSION ATTRIBUTE object can be provided to a PATH message and used for identification and diagnosis of a session. Further, this object has pre-emission (preemption), priority, local protection and so forth.

Figure 6:
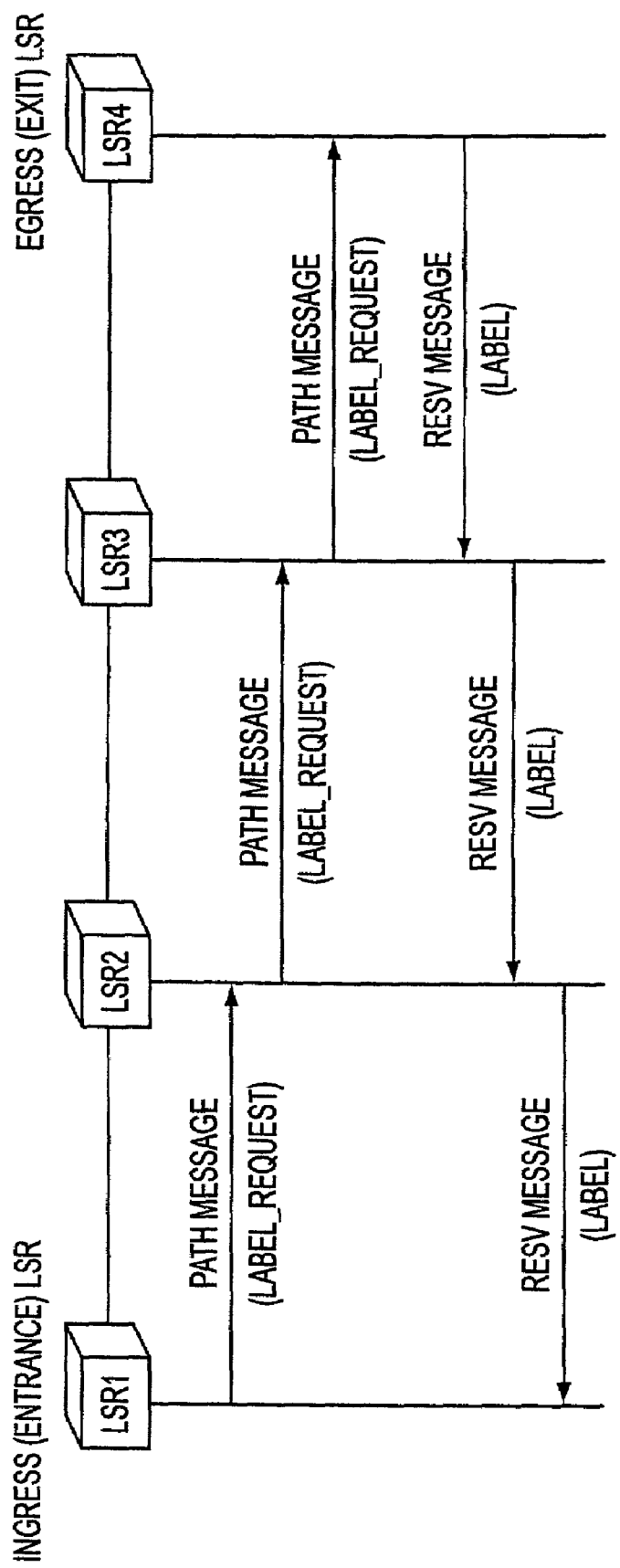
FIG. 6 is a view for explaining a flow of a message of the RSVP-LSP-Tunnel.

FIG. 6 illustrates a flow of a message of an LSP-tunnel in which the RSVP is used. The RSVP-tunnel is a Downstream-on-demand system since a label is allocated from the downstream. As can be recognized also from FIG. 6, a first MPLS router (LSR1) in an MPLS domain places a LABEL REQUEST object into a PATH message of the RSVP and transmits the PATH message to the downstream. Thereafter, if the PATH message arrives at a node (LSR4) of the destination, then the destination node (LSR4) places a LABEL object into a Resv message and returns the Resv message to the upstream. The manner of allocation of a label is such as described hereinabove.

In the present invention, a traffic characteristic value is embedded into and transferred together with the RSVP message.

(2-2) Description of the Load Distribution Method in the MPLS

Figure 7:
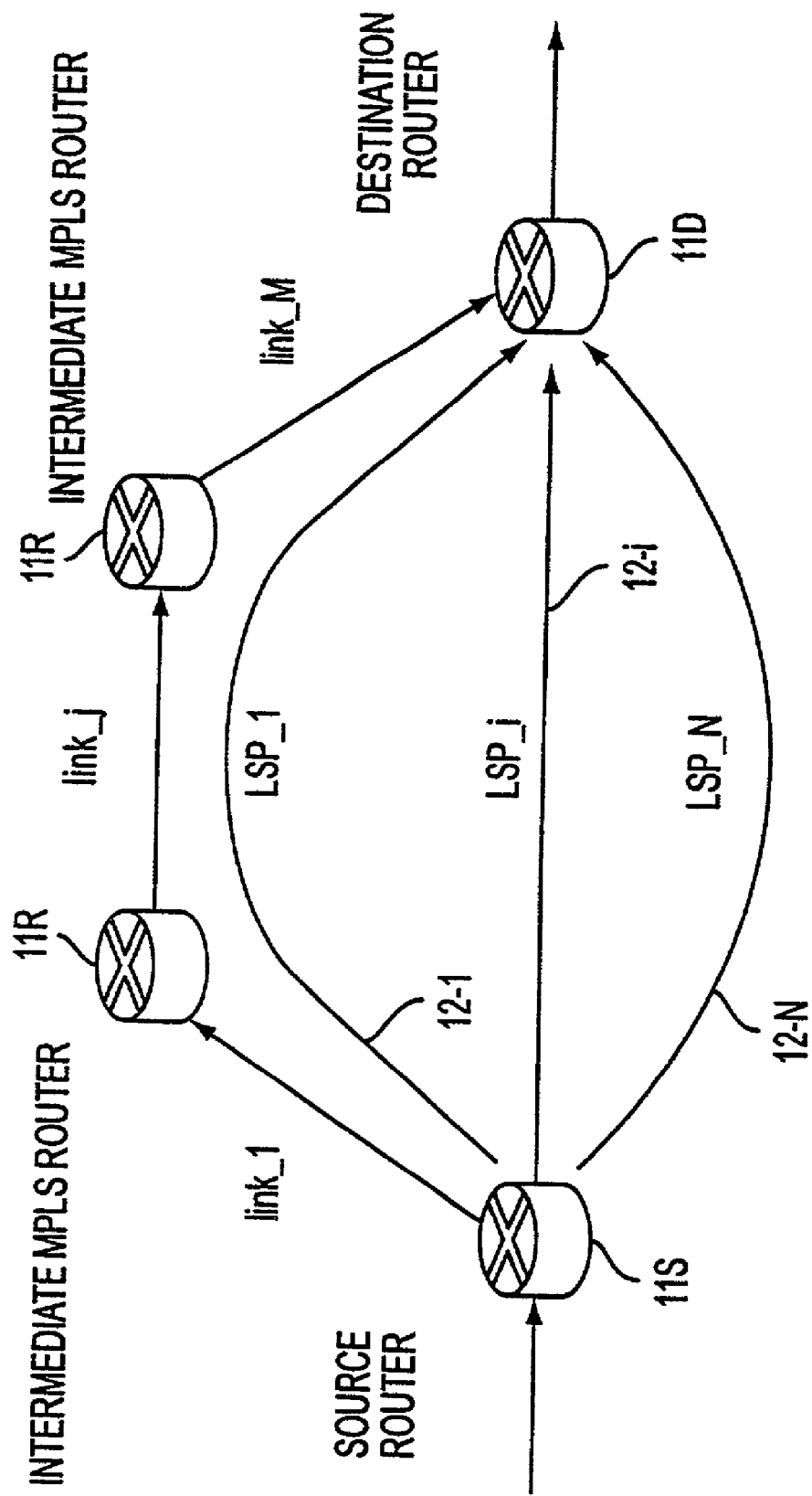
FIG. 7 is a view for explaining an MPLS network applied to an embodiment of the present invention.

In order to perform load distribution using the MPLS, using the LSP described hereinabove, a plurality of transmission paths [path, i.e., LSP; in the present embodiment, a path and an LSP are used in the same meanings] 12-$i$ (i=1 to N:N is a natural number) are set between a source MPLS router (a source communication apparatus) 11S and a destination MPLS router (a destination communication apparatus) 11D as shown in FIG. 7. In this instance, the LSP is set using a label of the MPLS. For the setting of the LSP, an LSP setting protocol such as the RSVP-LSP-Tunnel is used. It is to be noted that, in FIG. 7, reference character 11R denotes a intermediate MPLS router (a intermediate communication apparatus).

Further, a portion of a transmission path between routers is called link, and, for example, a transmission path 12-1 in FIG. 7 is composed of M links (link_1 to link_M).

It can also be recognized that the network architecture of the MPLS shown in FIG. 7 may be an IP network which includes a source MPLS router 11S, a destination MPLS router 1D, a plurality of transmission paths 12-$i$ (i=1 to N:N is a natural number) which can be set between the source MPLS router 11S and the destination MPLS router 1D, and a intermediate MPLS router 11R interposed in one of the transmission paths 12-$i$. It is to be noted that, also in the present embodiment, where the source MPLS router 11S, destination MPLS router 11D and intermediate MPLS router 11R are represented without specific distinction among them, they are referred to as merely MPLS routers 11.

Figure 8:
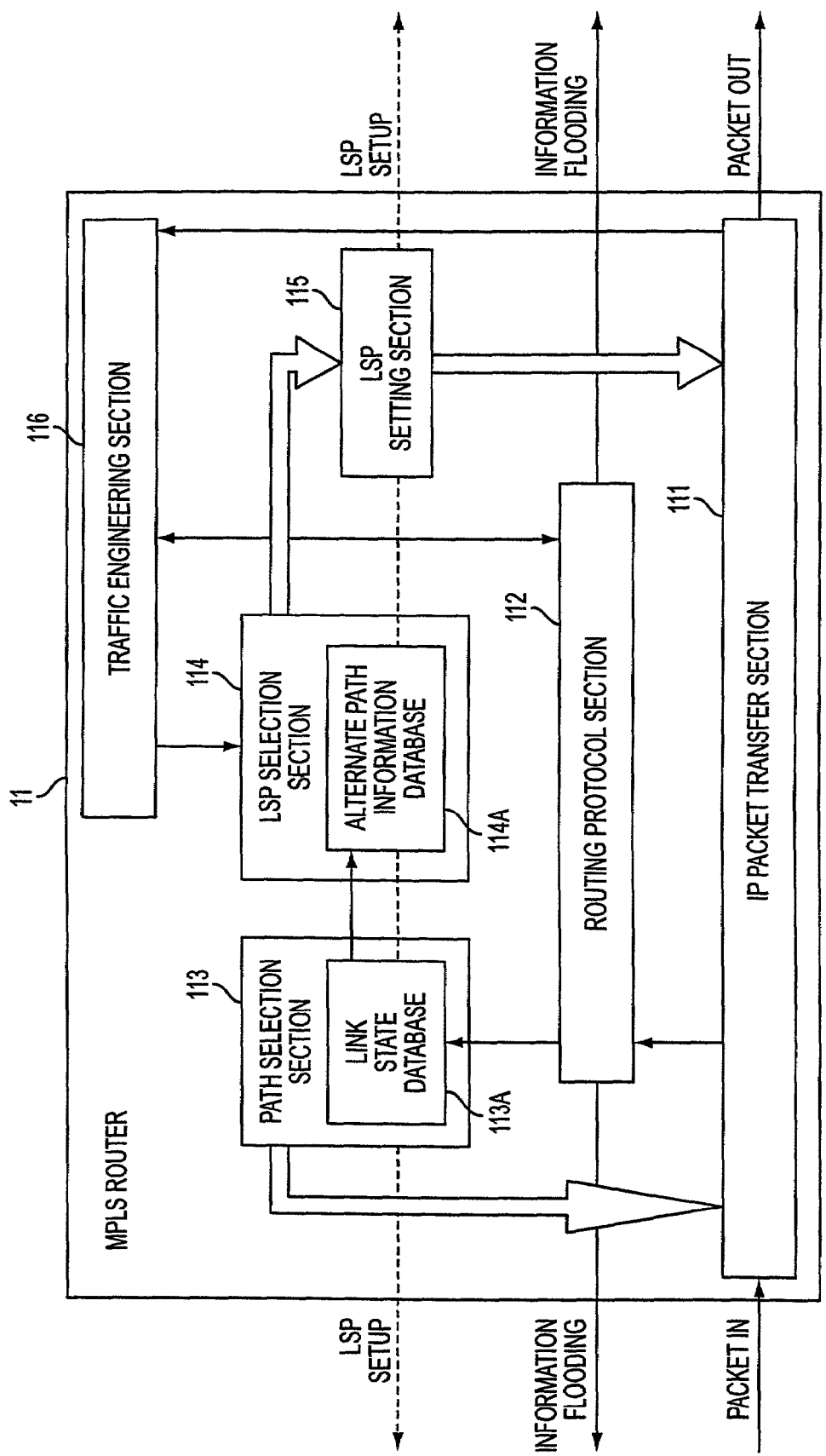
FIG. 8 is a functional block diagram of an MPLS router as an embodiment of the present invention.

FIG. 8 shows a functional block diagram of an exemplary embodiment of an MPLS router which forms an IP network. As shown in FIG. 8, the MPLS router 11 includes an IP packet transfer section 111, a routing protocol section 112, a path selection section 113, an LSP selection section 114, an LSP setting section 115 and a traffic engineering section 116.

Here, the IP packet transfer section 111 has a function of performing desired processing such as IP packet transfer processing for an input packet and transferring the packet to another router. The routing protocol section 112 mediates notification of traffic characteristics to another router or collection of traffic characteristics from another router. It is to be noted that the routing protocol section 112 further has a function of rendering, when the MPLS router is connected to the network, the routing protocol operative to discover the other MPLS routers connected to the network. For the discovery, a Hello packet is used usually.

The path selection section 113 has a function of producing a link state database (Link State Database) 113A for path selection when the topology of the network is discriminated by the routing protocol. The link state database 113A cooperates with the LSP setting section 115 through the LSP selection section 114 to set an LSP with another MPLS router.

The LSP selection section 114 has a function of cooperating with the link state database 113A of the path selection section 113 to produce an alternate path information database 114A for LSP selection. At this time, a routing table unique to the MPLS which is not used in conventional routing protocols is produced. The alternate path information database 114A cooperates with the traffic engineering section 116 to set an alternative path using an LSP as needed. In short, a plurality of LSPs to an MPLS router at the end are set so that load may be balanced between the LSPs.

The LSP setting section 115 has a function of setting a plurality of LSPs to an MPLS router at the end in response to a result of LSP selection by the LSP selection section 114. A result of the LSP setting by the LSP setting section 115 is transmitted to the IP packet transfer section 111, and a transfer form of an IP packet is set by the IP packet transfer section 111.

Figure 9:
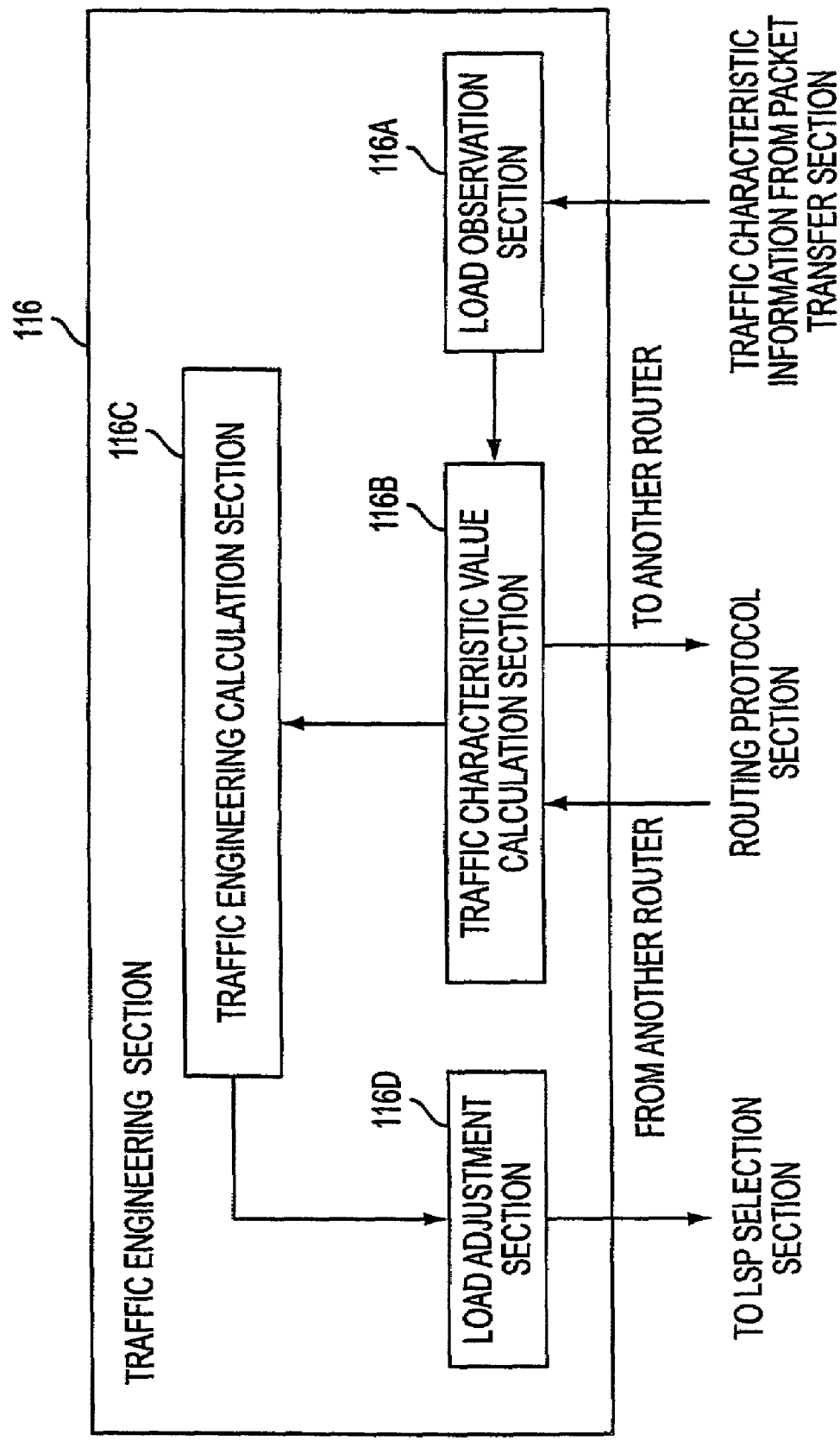
FIG. 9 is a functional block diagram showing details of a traffic engineering section of the MPLS router as the embodiment of the present invention.

The traffic engineering section 116 has a series of functions regarding a load balance according to the present invention. As shown in FIG. 9, the traffic engineering section 116 includes a load observation section 116A, a traffic characteristic value calculation section 116B, a traffic engineering calculation section 116C and a load adjustment section 116D.

The load observation section 116A has a function of sending traffic characteristic values such as utilization and a packet loss number sent thereto from the packet transfer section 111 to the traffic characteristic value calculation section 116B. The traffic characteristic value calculation section 116B has a function of performing smoothing or maximization of the traffic characteristic values and transmitting a resulting value to another MPLS router and another function of collecting traffic characteristic values sent thereto from another MPLS router and sending them to the traffic engineering calculation section 116C.

The traffic engineering calculation section 116C has a function of performing calculation of an effective load, an effective bandwidth and so forth and performing adjustment of load in response to the bandwidths of the individual LSPS. A result of the calculation (operation) obtained by the traffic engineering calculation section 116C is transmitted to the load adjustment section 116D.

The load adjustment section 116D has a function of determining a width of a traffic share based on the information from the traffic engineering calculation section 116C and sending a result of the determination to the LSP setting section 115 through the LSP selection section 114. The LSP setting section 115 thereafter sets a traffic sharewidth at the IP packet transfer section 111.

In particular, the traffic engineering section 116 has functions of a traffic characteristic collection section for collecting traffic characteristics of LSPs (transmission paths) connected to the LSP router itself or the other MPLS routers, a traffic characteristic notification section for notifying the other MPLS routers of the traffic characteristics collected by the traffic characteristic collection section, a load calculation section for calculating load based on the traffic characteristics collected by the traffic characteristic collection section, a decision section for deciding whether or not an LSP should be added or deleted based on the load information determined by the load calculation section, and a load equalization section for equalizing the load determined by the load calculation section among the plurality of LSPi (i is a natural number). This traffic engineering section 116 makes a principal part of the transmission path controlling apparatus of the present invention.

It is to be noted that principally the load observation section 116A and the traffic characteristic value calculation section 116B exhibit the function of the traffic characteristic collection section 3, the traffic engineering section 116 exhibits the function of the traffic characteristic notification section 4, and the traffic engineering calculation section 116C exhibits the functions of the load calculation section 5, decision section 6 and load equalization section 7.

Further, in order to allow an MPLS router to have the functions of the traffic characteristic collection section, traffic characteristic notification, load calculation section, decision section and load equalization described above, normally from a medium on which a transmission path controlling program for causing a computer to function as traffic characteristic collection unit for functioning as the traffic characteristic correction section described above (the traffic characteristic collection unit has a function of collecting traffic characteristics of those of the transmission paths connected to the MPLS router or the other MPLS routers), traffic characteristic notification unit for functioning as the traffic characteristic notification section (the traffic characteristic notification unit has a function of notifying the other MPLS routers of the traffic characteristics collected by the traffic characteristic collection unit), a load calculation unit for functioning as the load calculation section (the load calculation unit has a function of calculating load based on the traffic characteristics collected by the traffic characteristic collection unit), a discrimination unit for functioning as the decision section (the discrimination unit has a function of discriminating whether or not a transmission path should be added or deleted based on the load information determined by the load calculation unit), and a load equalization unit for functioning as the load equalization section (the load equalization unit has a function of equalizing the load determined by the load calculation unit among the plurality of transmission paths) is recorded, the transmission path controlling program is installed into each of the MPLS routers.

The installation may be performed by setting a recording medium such as a floppy disk or an MO disk to a computer or by using a transmission path controlling program distributed over a network (for example an IP network).

It is to be noted that, since an actual IP network may be formed like a cobweb using an MPLS router as a node, any MPLS router can serve as a source MPLS router, a destination MPLS router or a intermediate MPLS router, and consequently, although the present embodiment is shown as an example wherein the traffic engineering section 116 of each of the source MPLS router 11S, destination MPLS router 11D and intermediate MPLS router 11R shown in FIG. 7 has all of the functions of the traffic characteristic collection section, traffic characteristic notification section, load calculation section, decision section and load equalization section described above, it is otherwise possible that the traffic engineering section of the source MPLS router 11S has the functions of the traffic characteristic collection section, traffic characteristic reception section, load calculation section, decision section and load equalization, and the traffic engineering section provided in each of the destination MPLS router 11D and intermediate MPLS router 11R other than the source MPLS router 11S has only the functions of the traffic characteristic collection section and traffic characteristic notification section.

In the following, a load distribution algorithm performed in the traffic engineering section 116 is described in detail.

(2-3) Load Distribution Algorithm Performed in Each MPLS router 11

First, the MPLS router 11 performs, for each port thereof, traffic collection regarding required traffic items [for example an output packet amount from an output port, an abandoned packet number (NLOSS) at the output port, a logical bandwidth (LBW) of the output port and so forth] as traffic characteristic values after each time t1 [seconds (sec)] (procedure S1).

Then, the MPLS router 11 calculates a transmission line utilization CUTY at present from the obtained traffic characteristic values in accordance with the following expression (procedure 2).

$$CUTY = \text{output packet amount from output port/logical bandwidth of output port} \quad (1)$$

Hence, it follows that the traffic characteristic collection section has means for calculating utilization of the transmission paths connected to the router based on the collected traffic characteristic values. As a result, in what condition each of the transmission paths is used can be grasped in detail.

At this time, also working processing of information (the transmission line utilization CUTY) regarding the obtained traffic characteristic values is performed.

The processing manner is such as follows.

① Smoothing processing is performed. Such smoothing processing is performed, as an example, by calculating the following expression each time an observation value is obtained to obtain a value MUTY.

$$MUTY = \alpha \times CUTY + (1-\alpha) \times MUTY \quad (2)$$

where α is a smoothing coefficient.

Consequently, it is considered that the traffic characteristic collection section has means for smoothing information (the transmission line utilization CUTY) regarding collected traffic characteristic values. More particularly, it is considered that the traffic characteristic collection section has means for smoothing, after traffic characteristics of transmission paths connected to the MPLS router are collected, the statistical values in accordance with, for example, the Exponential Moving Average method. As a result, an influence of a sudden traffic variation can be reduced.

Further, since the transmission path utilization CUTY at present determined from the obtained traffic characteristic values is smoothed as described above, it follows that a smoothing unit may be constructed so as to smooth the utilization calculated by the utilization calculating unit. Consequently, the utilization of the individual transmission paths can be grasped accurately while eliminating traffic variation influences.

② Maximum value extraction processing is performed. Such maximum value extraction processing is performed by calculating a maximum value of observation values. In other words, the maximum value of the observation values is placed as the work value MUTY. This may be represented in an expression as follows.

$$MUTY=\max(\text{observation values}) \qquad (3)$$

Consequently, it is considered that the traffic characteristic collection section has means for determining a maximum value of collected characteristic values as a representative value of the traffic characteristic values. As a result, transmission path selection control can be performed within a degree of certainty.

It is to be noted that, as regards the smoothing processing and the maximum value extraction processing described above, both of the smoothing processing and the maximum value selection processing may be performed or only one of the smoothing processing and the maximum value selection processing may be performed.

③ A total number TLOSS of abandoned packets may be calculated in accordance with the following expression.

$$TLOSS(n)=TLOSS(n-1)+NLOSS \qquad (4)$$

where TLOSS(n) is the total number of abandoned packets after updated, TLOSS(n−1) is the total number of abandoned packets before updated, and NLOSS is the number of newly abandoned packets.

Thereafter, the MPLS router 11 executes distribution of the track characteristic values (MUTY, TLOSS and so forth) after each time t2 [sec] making use of Flooding of the routing protocol.

It is to be noted that TLOSS is reset (that is, to 0) after completion of the flooding.

Also where the maximum value is adopted for MUTY, MUTY is reset (that is, to 0).

Consequently, it is considered that the traffic characteristic notification section has means for notifying information regarding traffic characteristics utilizing a packet prepared by the routing protocol. More particularly, it is considered that the traffic characteristic notification section has means for distributing, after traffic characteristics of the transmission paths connected to the MPLS router are collected, the characteristic values making use of a packet prepared by the routing protocol such as the OSPF or the IBGP to notify another MPLS router of the information. As a result, an existing protocol can be utilized, and consequently, it is not necessary to newly prepare a routing protocol for exclusive use, which contributes to reduction of the cost and so forth.

Also it is considered that the traffic characteristic notification section has means for notifying information regarding traffic characteristics after each fixed period t2 [sec]. As a result, the arithmetic load applied to an arithmetic unit such as a CPU which executes arithmetic operation and so forth can be reduced.

Further, in the present embodiment, it is considered that the traffic characteristic notification section has means for notifying information regarding traffic characteristics with a message of the RSVP expanded. More particularly, it is considered that the traffic characteristic notification section has means for distributing, after traffic characteristics of the transmission paths connected to the MPLS router are collected, the characteristic values with a message of the RSVP expanded to notify another MPLS router of the information. As a result, an existing protocol can be utilized, and consequently, it is not necessary to newly prepare a routing protocol for exclusive use, which contributes to reduction of the cost and so forth.

Further, it is considered that the traffic characteristic collection section has means for collecting a unit of a flux of flows for collection of traffic characteristics in a unit of a label used in the MPLS. As a result, collection of fine traffic characteristic becomes possible, which contributes to augmentation of the collection accuracy.

It is to be noted that similar effects can be achieved also by an alternative construction wherein calculation of the transmission path utilization at present is performed after some or all of the smoothing processing, the maximum value extraction processing and the total abandoned packet number calculation processing described above are performed for the collected traffic characteristic values.

On the other hand, also it is possible to employ a further construction wherein the calculation processing of the transmission path utilization is assigned to the MPLS router 11S which serves as a start point of load distribution while the intermediate MPLS routers and the destination router perform only the other processing (smoothing processing, maximum value extraction processing, total abandoned packet number calculation processing and traffic characteristic value notification processing) than the transmission path utilization calculation processing.

A load distribution algorithm performed by a traffic engineering section 116' of each of the intermediate MPLS routers 11R' and the destination router 11D' (the routers mentioned are hereinafter denoted generally by 11') having the construction just described is described in detail below.

First, similarly to the traffic engineering section 116 described above, also the traffic engineering section 116' of the MPLS router 11' performs, for each port thereof, traffic collection regarding required traffic items [for example an output packet amount (L) from an output port, an abandoned packet number (NLOSS) at the output port, a logical bandwidth (LBW) of the output port and so forth] as traffic characteristic values after each time t1 [seconds (sec)].

Then, the traffic engineering section 116' performs smoothing processing of the obtained output packet amounts. Such smoothing processing is performed by obtaining a value ML by calculating the following expression each time an observation value is obtained:

$$ML=\alpha \times L+(1-\alpha)\times ML' \qquad (5)$$

where α is a smoothing coefficient, and ML' is ML calculated in the preceding cycle.

Then, maximization extraction processing is performed. This processing is performed by placing a maximum value of the observation values as a work value ML. It is to be noted that the maximization extraction processing can be omitted.

Further, similarly to the traffic engineering section 116 described above, the traffic engineering section 116' calculates a total number TLOSS of abandoned packets in accordance with the expression (4).

Thereafter, the traffic engineering section 116' executes distribution of the traffic characteristic values (ML, TLOSS and so forth) after each time t2 [sec] making use of Flooding of the routing protocol.

It is to be noted that, similarly to the traffic engineering section 116, the traffic engineering section 116' resets TLOSS (that is, to 0) after each completion of the flooding and, where the maximum value is adopted as ML, the traffic engineering section 116' resets ML (that is, to 0) as well.

Consequently, similarly to the MPLS router 11 described hereinabove, also the MPLS router 11' of the present modification can achieve those effects provided by the smoothing processing, the maximum value extraction processing, the total abandoned packet number calculation processing and the traffic characteristic value notification processing. Further, since the smoothing processing of information regarding the traffic characteristics is assigned to the MPLS router 11S which serves as a start point of load distribution, the time required to work the traffic characteristics by the MPLS router 11' can be reduced from that by the MPLS router 11 described above and the MPLS router 11' can be simplified in construction, which contributes to reduction of the cost and so forth.

(2-4) Load Distribution Algorithm Performed by the MPLS Router 11S Serving as a Start Point of Load Distribution First, flooding information of which the MPLS router 11S which is determined as a start point of load distribution is notified includes the average link utilization (or maximum value of observation values) MUTY (or average output packet amount ML), abandoned packet number TLOSS, output port logical bandwidth LBW and so forth as described hereinabove.

Here, where the MPSL router 11S receives the average output packet amount ML, the link utilization MUTY of each router is calculated using an output port logical bandwidth LBW and so forth received together. Whether the other intermediate routers have an average link utilization calculation function and issues a notification of the calculated average link utilization MUTY, the link utilization calculation function need not to be provided for the MPLS router 11S side.

The MPLS router 11S which serves as the start point of load variation performs path state checking, calculation of an effective load and load adjustment.

As regards the path state checking, congestion state checking of the individual routes from the MPLS router (start point router) 11S to the MPLS router (end point router) 11D is performed in the following manner after each fixed period t3 [sec].

On the premise that a plurality of paths are laid between the MPLS router 11S which servers as the start point of load distribution control and the MPLS router 11D which is determined as an end point of the load distribution control and each path extends through a plurality of intermediate MPLS routers 11R, the congestion state checking for each route discriminates, from utilization of each path, collected from each of the intermediate MPLS routers 11R of the path, based on an average utilization of the transmission paths (links) connected to the intermediate MPLS router 11R [this congestion state checking manner is referred to as congestion state checking manner where utilization of links j (link j) of a path i are averaged].

This can be represented in such an expression as given below.

$$\rho \text{ path } i = \text{Average}(MUTY(\text{link } j, \text{ path } i)) \quad (6)$$

Consequently, in this instance, it is considered that the traffic characteristic collection section provided in the source MPLS router 11S has means for discriminating utilization of each transmission path connected to the source MPLS router based on an average utilization of the transmission paths connected to intermediate MPLS routers collected from the intermediate MPLS routers. As a result, this can contribute to augmentation of the efficiency in use of the network.

Further, on a premise similar to that in the congestion state checking manner where utilization of links j of a path i are averaged described above, the congestion state checking for each route may be such congestion state checking that it discriminates, from utilization of each path, collected from each of the intermediate MPLS routers, based on a maximum utilization of the transmission paths (links) connected to the intermediate MPLS router (this congestion state checking manner is referred to as congestion state checking manner where a maximum value of utilization of all links of a path i is adopted).

This can be represented in the following expression.

$$\text{path } i = \text{Max}(MUTY(\text{link } j, \text{ path } i)) \quad (7)$$

Consequently, in this instance, it is considered that the traffic characteristic collection section provided in a source MPLS router has means for discriminating utilization of each transmission path connected to the source MPLS router based on a maximum utilization of transmission paths connected to intermediate MPLS routers collected from the intermediate MPLS routers. As a result, transmission path selection control can be performed within a degree of certainty.

It is to be noted that the sum total TLOSS path i of abandoned packets of the path i may be determined in accordance with the following expression.

$$TLOSS \text{ path } i = \Sigma TLOSS \text{ link } j \quad (8)$$

It is to be noted that i above is the number of the path (LSP) and j is the link number.

Also it is considered that the traffic characteristic collection section provided in a source MPLS router has means for discriminating after each fixed period t3 [sec] whether or not each transmission path is in congestion. By this, the arithmetic load applied to an arithmetic unit such as a CPU which executes arithmetic operation and so forth can be reduced.

Calculation of the effective load (Effective load) ρ effective path i may be performed in the following manner.

Here, the effective load is defined as an effective utilization calculated from utilization of a link and a packet loss number at the link. Originally, an actual load applied to the link should be measured. However, the inside of a router actually has a multi-stage switch construction and it is difficult to directly measure the load. Accordingly, in the present embodiment, a load is estimated using only utilization of a link and a packet loss number, and the estimated load is referred to as effective load.

Figure 10:
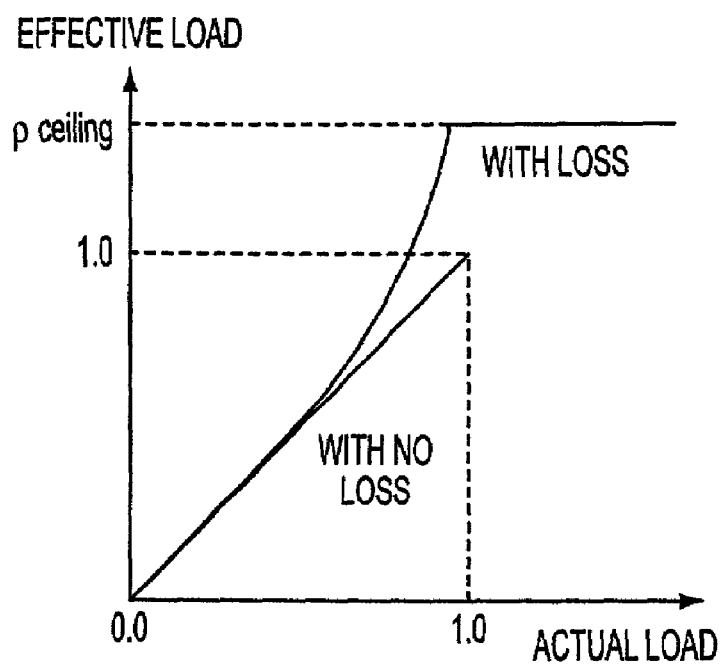
FIG. 10 is a view for explaining an effective load.

The effective load is described with reference to FIG. 10. In particular, as can be seen apparently from a characteristic of FIG. 10, if no packet loss is involved, then the load ρ path i and the effective load at the link are equal to each other. However, if packet loss occurs, then the load ρ path i is corrected with a predetermined function f(TLOSS path i) so that a rather high load may be obtained, and a resulting value is used as the effective load. It is to be noted that an upper limit ρ ceiling is provided to the effective load. This can be represented in the following expression.

$$\rho \text{ effective path } i = \rho \text{ path } i \times f(TLOSS \text{ path } i) \quad (9)$$

$$\rho \text{ effective path } i = \text{Min}(\rho \text{ effective path } i, \rho \text{ ceiling}) \quad (10)$$

where f(TLOSS path i) is a function regarding TLOSS path i, and ρ ceiling is an upper limit load, that is, an upper limit value to the effective load ρ effective path i.

This function is exhibited in the load calculation section provided in a source MPLS router for calculating an effective load taking a number of abandoned packets generated in a intermediate MPLS router into consideration. Consequently, in a situation that a plurality of paths are laid between an MPLS router which is determined as a start point of load distribution control and another MPLS router which is determined as an end point of the load distribution control and each path extends through a plurality of intermediate MPLS routers, when the MPLS router which serves as the start point of the load distribution control calculates a load based on traffic characteristics notified of, it can calculate, taking the number TLOSS path i of abandoned packets generated in each intermediate MPLS router into consideration, the effective load ρ effective path i in accordance with the following equation.

effective load to ith path=load to ith path×f(abandoned packet number)

It is to be noted that f(abandoned packet number) is a function wherein the abandoned packet number is a variable.

As a result, even if a load is not directly measured, an effective load can be estimated by a simple method.

Further, in another embodiment, it is considered that the effective load calculation unit is constructed such that, when it calculates an effective load, it sets an upper limit to the effective load. Consequently, load estimation of an excessive amount can be avoided, and as a result, appropriate transmission path selection control can be performed.

The load adjustment is performed in the following manner.

The load adjustment is executed after each time t4 [sec], and if the effective load to each path (LSP) can be calculated in such a manner as described above, then utilization at all paths (LSP) is determined subsequently. In the present embodiment, all paths are regarded as a single virtual pipe, and a load to the pipe is calculated.

In particular, in this instance, it is considered that the decision section provided in a source MPLS router has means for calculating effective bandwidths from effective loads obtained by the effective load calculation unit and regarding all of the transmission paths as one virtual pipe and then determining utilization of the virtual pipe. In this instance, the utilization may be determined in accordance with the following expression.

$$\text{utilization } \rho \text{ effective all when all paths are regarded as one virtual pipe} = \Sigma(\rho \text{ effective path } i \times LBW \text{ path } i)/\Sigma LBW \text{ path } i \quad (11)$$

where ρ effective path is the effective load of the path i, and LBW path i is the logical bandwidth of the path i.

Consequently, it can be prevented to unnecessarily add a new transmission path, and this can contribute also to effective utilization of the network.

Subsequently, effectiveness of multi-paths is verified.

In particular, the utilization obtained from the expression (11) is compared with a set reference value ρ offer1 for path addition, and when the obtained value of the utilization is higher than the reference value for path addition, a new transmission path is added. Further, the utilization obtained from the expression (11) is compared with a set reference value for path deletion similarly, and if the obtained value of the utilization is lower than a reference value ρ offer2 for path deletion, then a path whose load is low is deleted. In particular, if the calculated load described above is high, then a new path is added, but if it is low, an existing path is deleted.

This can be logically represented in the following manner.
If ρ effective all≧ρ offer1 then
  if timer1 was expired then (the left signifies "if the time has expired already")
  search new path and add new path (the left signifies "to the alternative path search processing")
  endif
  elseif ρ effective all<ρ offer2 then
  if timer2 was expired then (the left signifies "the timer has expired already")
  delete path (the left signifies "to the alternative path deletion processing")
  endif
endif Consequently, it is considered that the decision section provided in a source MPLS router has means for comparing a pipe utilization obtained by the pipe utilization calculation unit with a set reference value to perform discrimination of whether or not a transmission path should be added or deleted in response to a result of the comparison, and adds a new transmission path if the pipe utilization obtained by the pipe utilization calculation unit is higher than a reference value for path addition, but deletes a transmission path whose load is low if the pipe utilization obtained by the pipe utilization calculation unit is lower than a reference value for path deletion. As a result, up-to-date optimum path selection can be performed.

It is to be noted that, as a modification to the verification procedure of the validity of multi-paths described above, it is otherwise possible to calculate, in addition to the pipe utilization (total utilization of all paths) obtained using the expression (11), a rate of change of the pipe utilization per time and perform decision of addition or deletion of a transmission path based on the rate of change of the pipe utilization. A procedure in this instance is described in detail below.

First, a difference value ΔU(t) between two pipe utilization obtained after a very small interval t4 is calculated as the rate of change of the pipe utilization per time in accordance with the following expression.

$$\Delta U(t) = \{\rho \text{ effective all}(t-1) - \rho \text{ effective all}(t)\}/t4 \quad (12)$$

where ρ effective all(t) is the total utilization of all paths at time t, and ρ effective all(t−1) is the total utilization at a measurement time t−1 prior by one cycle to time t.

It is to be noted that it is otherwise possible to represent a change of the pipe utilization with respect to time obtained in accordance with the expression (11) as a function of the time and calculate a differential value of the pipe utilization at a certain point of time and then use the differential value as the rate of change of the pipe utilization per time. This allows a more accurate rate of change of the pipe utilization to be grasped.

Then, the utilization obtained in accordance with the expression (11) and a reference value ρ offer1 for path addition set therefore are compared with each other, and the rate of change obtained in accordance with the expression (12) and a reference value ρ offerd1 for path addition set therefore are compared with each other. Then, when the values of the obtained utilization and rate of change both exceed the corresponding reference values for path addition, a new transmission path is added. Further, the utilization obtained in accordance with the expression (11) and a reference value ρ offer2 for path deletion set therefore are compared with each other, and the rate of change obtained in accordance with the expression (12) and a reference value ρ offerd2 for path deletion set therefore are compared with each other. Then, when the value of the obtained utilization or rate of change is smaller than the corresponding reference value for path deletion, a path which has a comparatively low load is deleted. In other words, also in this instance, if the load calculated as above is high, then a new path is added, but if the load is low, then an existing path is deleted.

This can be logically represented in the following manner.

If (ρ effective all≧ρ offer1 or ΔU(t)≧ρ offerd1) then if timer1 was expired then (the left signifies "if the timer has expired already")

search new path and add new path (the left signifies "to the alternative path search processing")

endif elseif (ρ effective all<ρ offer2 and ΔU(t)<ρ offerd2) then if timer2 was expired then (the left signifies "the timer has expired already")

delete path (the left signifies "to the alternative path deletion processing")

endif endif

Through the construction described above, since decision of addition or deletion of a path is performed with a change in time of the pipe utilization taken into consideration, addition or deletion of a path can be performed more effectively than where such decision is based only on the pipe utilization.

It is to be noted that, while, in the construction described above, logical ANDing (and) of results of comparison is used for discrimination of addition of a path and logical ORing (or) of results of comparison is used for discrimination of deletion of a path, the criteria for addition/deletion of a path are not limited to the combination given above, but those criteria (logical ANDing and logical ORing) may be used in a different combination in accordance with a configuration or a state of the network, or some other criteria may be used. This allows an integrated amount of the pipe utilization to be grasped appropriately in accordance with the configuration or the state of the network.

Meanwhile, as another modification to the verification procedure of the validity of multi-paths, also it is possible to calculate, in addition to the pipe utilization (total utilization of all paths) obtained using the expression (10), an integral amount of the pipe utilization in a fixed time and perform discrimination of addition or deletion of a transmission path based on the integral amounts of the pipe utilization.

In this instance, as an integral amount of the pipe utilization in a fixed time, an integral value ∫MU(t) of the pipe utilization within a fixed time t4 may be calculated in accordance with the following expression.

[Expression 1]

$$\int MU(t) = \int_{-t}^{-t+t4} MU(t)dt \tag{13}$$

In other words, ∫MU(t) is an integral value of the pipe utilization MU within the fixed time from t to t4.

Also it is possible to calculate a number of times by which the pipe utilization exceeds a certain reference value within the fixed period of time and use the number of times as the integrated amount of the pipe utilization within the fixed period of time. This allows the integrated amount of the pipe utilization to be grasped by a simpler construction.

Then, the utilization obtained in accordance with the expression (11) and a reference value ρ offer1 for path addition set therefore are compared with each other, and the integrated amount obtained in accordance with the expression (13) and a reference value ρ offeri1 for path addition set therefore are compared with each other. Then, a new transmission path is added based on results of the comparison. Further, the utilization obtained in accordance with the expression (11) and a reference value ρ offer2 for path deletion set therefore are compared with each other, and the integrated amount obtained in accordance with the expression (13) and a reference value ρ offeri2 for path deletion set therefore are compared with each other. Then, a path which has a comparatively low load is deleted based on results of the comparison.

Also in this instance, upon decision of addition or deletion of a path, various criteria such as logical ORing and logical ANDing of the results of comparison may be used in a suitable combination in accordance with the configuration or the state of the network, and this allows the integrated amount of the pipe utilization to be grasped appropriately. Further, where discrimination is performed based only on the integrated amount without using the utilization, decision of addition or deletion of a path can be performed with a simpler construction.

From the foregoing construction, it follows that the decision section provided in the source router has a calculation unit for calculating an effective bandwidth from the effective load obtained by the effective load calculation unit and for determining, regarding all of the transmission paths as one virtual pipe, information regarding utilization of the virtual pipe (a pipe utilization, a rate of change of the pipe utilization, an integrated amount of the pipe utilization) and is constructed so as to perform decision of whether or not a transmission path should be added or deleted based on the information regarding the utilization of the virtual pipe (at least one of the pipe utilization, the rate of change of the pipe utilization, and the integrated amount of the pipe utilization). Consequently, it is possible to perform addition and deletion of a transmission path appropriately taking the loads of the transmission paths at present into consideration, and distribution of the load can be anticipated efficiently and selection of an appropriate path can be performed in accordance with the situation of the network or the performance of the hardware.

Further, similarly to the foregoing construction, it follows that the decision section provided in the source router is constructed so as to perform comparison of at least one of a set of the pipe utilization obtained by the calculation unit and a first reference value (ρ offer1, ρ offer2), another set of the rate of change obtained by the calculation unit and a second reference value (ρ offerd1, ρ offerd2) and a further set of the integrated value obtained by the calculation unit and a third reference value (ρ offeri1, ρ offeri2), and perform decision of whether or not a transmission path should be added or deleted in response to a result of the comparison. More particularly, when at least one of the utilization, the rate of change and the integrated amount exceeds a corresponding reference value for path addition, it is decided that a new transmission path should be added, but when at least one of the utilization, the rate of change and the integrated amount is lower than a corresponding reference value for path deletion, it is decided that a transmission path whose load is comparatively low should be deleted. Consequently, up-to-date optimum path selection can be performed in accordance with the situation of the network or the performance of the hardware.

By the way, if it is decided upon verification of the validity of multi-paths described above that a transmission path should be deleted, then a path of a candidate for deletion is selected based on several conditions, and the utilization of all paths (loads to the other transmission paths) when the path of the candidate for deletion is deleted is estimated and compared with a predetermined reference value. Then, a path to be deleted actually is determined based on a result of the comparison.

More particularly, deletion of multi-paths is performed in accordance with the following algorithm.

① That one of all paths which has been laid first is excluded from the object of deletion.
② That one of all paths which has the smallest usable bandwidth is selected.
③ If a plurality of paths satisfy the condition of ② (have the smallest usable bandwidth), then that one of the paths which has the lowest effective load is selected.
④ If a plurality of paths satisfy the conditions of ② and ③ (have the smallest usable bandwidth and the lowest effective load), then that one of the paths which has the greatest hop number is selected.
⑤ If a plurality of paths satisfy the conditions of ②, ③ and ④ (have the smallest usable bandwidth, the lowest effective load and the greatest hop number), then that one of the paths which has been added last is selected.
⑥ The path selected through ①–⑤ is determined as a candidate for deletion, and the utilization of the entire multi-paths when the path is virtually deleted is calculated.
⑦ The utilization of the entire multi-paths after the deletion of the deletion candidate path calculated in ⑥ is compared with a congestion discrimination threshold value set therefore. If the utilization of the entire multi-paths after the deletion is equal to or higher than the threshold value, then a new deletion candidate path is selected through ①–⑤ again from among the paths other than the deletion candidate path.
⑧ If the comparison in ⑦ reveals that the utilization of the entire multi-paths after the deletion is lower than the congestion discrimination threshold value, then the deletion candidate path is deleted actually.

By performing deletion of a path in accordance with such an algorithm as described above, it follows that the decision section provided in the source router includes means for selecting a candidate of a transmission path as an object of deletion based on the load information determined by the load calculation unit, and for estimating the load to the other transmission paths when the transmission path of the candidate of deletion selected by the deletion candidate selection unit is deleted, and for comparing the load of the other transmission paths estimated by the load estimation unit with a predetermined reference value and determining whether or not the transmission path of the candidate of deletion should be deleted in response to a result of the comparison.

It is to be noted that, when the result of comparison between the information (utilization, rate of change, integrated amount) regarding the pipe utilization (total utilization of all paths) described hereinabove and the reference value is linked to the determination that a transmission path should be deleted (for example, when one of the different kinds of information regarding the pipe utilization is lower than the corresponding reference value), the path deletion algorithm described above is executed using the result of comparison as a trigger so that deletion of a path is performed actually.

From the construction described above, it follows that the decision section provided in the source router further includes a trigger unit for triggering the selection unit, estimation unit and determination unit to operate based on the information regarding the pipe utilization obtained by the calculation unit.

Consequently, a transmission path can be deleted in an up-to-date manner in response to a situation of the entire network.

After the validity of multi-paths is verified in this manner, an effective bandwidth (EBW) to be moved is calculated.

In particular, when to equalize load between a plurality of transmission paths added, in order to distribute the load in proportion to the logical bandwidths of the paths, the effective bandwidth is calculated in accordance with an expression (14) to perform load distribution.

$$\text{effective bandwidth to be moved of ith path} = (\text{average value of effective bandwidths of all paths} - \text{effective bandwidth of ith path}) \times \text{logical bandwidth of ith path} \quad (14)$$

Figure 11:
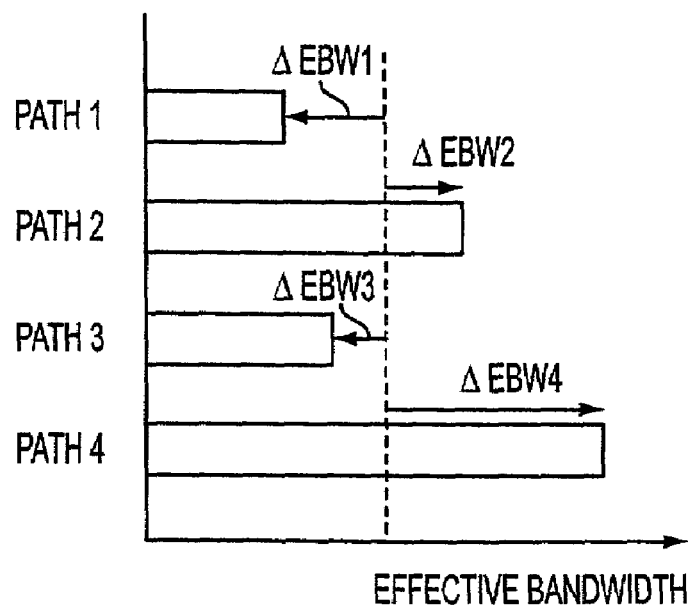
FIG. 11 is a view for explaining an effective bandwidth to be moved.

As a result, balancing of the load can be performed between different paths, and a concept diagram for illustrating an effective bandwidth is illustrated in FIG. 11. Referring to FIG. 11, ΔEBWi indicates an effective bandwidth to be moved, and this effective bandwidth is obtained by multiplying an effective load by the logical bandwidth LBW. As a result, ΔEBW can be calculated using an expression (15).

$$\Delta EBW \text{ path } i = (\rho \text{ effective all} - \rho \text{ effective path } i) \times LBW \text{ path } i \quad (15)$$

Consequently, it is considered that the load equalization provided in a source MPLS router has move effective bandwidth calculation means for determining an effective bandwidth to be moved at each of transmission paths from an average effective bandwidth determined for all transmission paths based on effective bandwidths obtained from effective loads obtained taking numbers of abandoned packets generated in intermediate MPLS routers into consideration. Consequently, equalization of load with bandwidths of transmission paths taken into consideration can be performed.

Then, after the effective bandwidth ΔEBW is determined in such a manner as described above, adjustment of the traffic share is performed finally.

In particular, IP packets flowing in are distributed to a plurality of paths in proportion to effective bandwidths to be moved calculated in accordance with the expression (14). When the IP packets flowing in are to be distributed to a plurality of paths, calculation by a Hash function is performed based on IP addresses and the IP traffic flow is distributed at random based on a result of the calculation.

The foregoing is described in more detail in regard to a case wherein a CRC (cyclic redundancy check) calculation is used as the Hash function.

amount $\Delta$ts path $i$ of traffic to be moved of ith path=effective bandwidth to be moved of ith path$\times Gr \times TS$/(total of (effective load to ith path$\times$ logical bandwidth of ith path) for all path) $=\Delta EBW$ path $i \times Gr \times TS/\Sigma(\rho$ effective path $i\times LBW$ path $i$)  (16)

where Gr is the load adjustment coefficient (1/$\rho$ceiling $\leq$Gr$\leq$1/100), TS is the width of a result of calculation of CRC arithmetic (in the case of CRC 16, the width of TS is 0-65535).

Gr: load adjustment coefficient

TS: width of traffic share=range of result of CRC 16=65535

Figure 12:
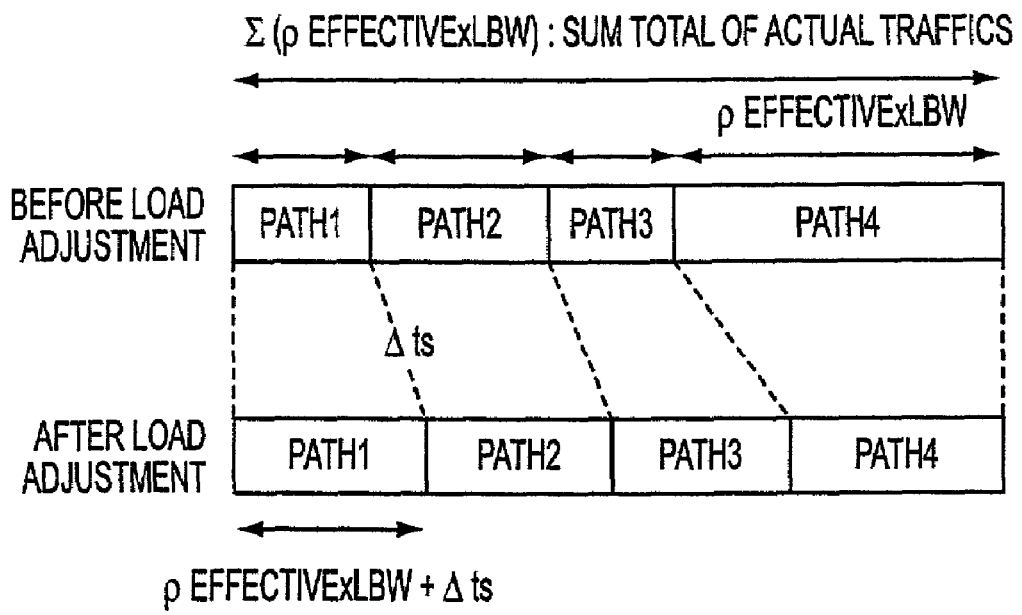
FIG. 12 is a view for explaining an example of a manner of load adjustment.

When load adjustment is performed in accordance with the expression above, the load adjustment distributions before and after the load adjustment are such as illustrated in FIG. 12.

In the present embodiment, the track share which has a significance of load adjustment is a parameter used to perform load distribution, and the sum total of traffic shares is a total value of actual traffic through all paths. The width of a traffic share is an integer from 0 to 65,535 where the CRC (cyclic redundancy check) 16 is used. When an IP packet arrives at a router, the load adjustment apparatus can perform CRC calculation based on an IP address (host address, destination address) of the IP packet, and as a result, a certain value between 0 and 65,535 is allocated to the IP flow. In short, the present load adjustment mechanism has a function of degrading an IP address to a width of a certain integer. In other words, IP flows arriving at a router are accommodated at random into individual paths.

Consequently, it is considered that the load equalization section provided in a source MPLS router is constructed such that it has a unit for distributing packets flowing into the source MPLS router to a plurality of transmission paths in proportion to effective bandwidths to be moved determined by the move effective bandwidth calculation unit and further that it thereupon performs arithmetic operation using a Hash function based on addresses and distributes traffic flows at random based on a result of the arithmetic operation. As a result, traffic flows can be distributed precisely by simple calculation.

It is to be noted that, as a simpler and higher-speed Hash function, replacement of positions and logical operation may be performed for bit values of an input value to produce a random integer value.

Figure 13:
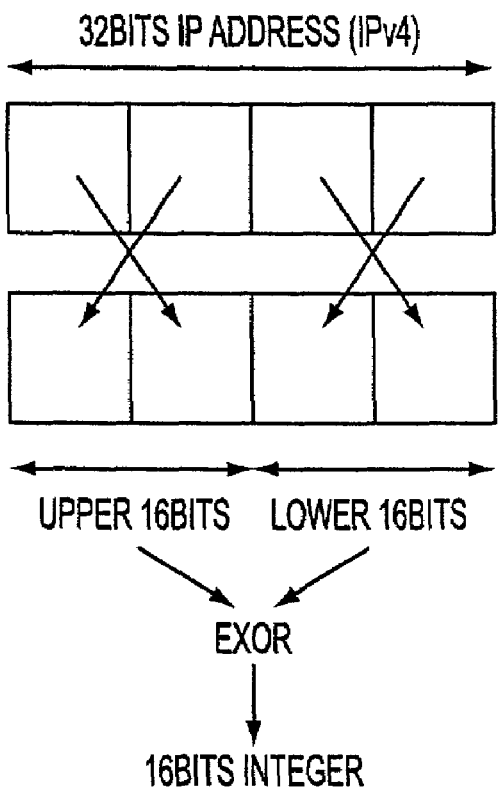
FIG. 13 is a view for explaining an example of a Hash function.

For example, as illustrated in FIG. 13, a destination IP address of 32 bits included in an IP packet is first divided into four areas of 8 bits. Then, the values of two adjacent 8-bits are replaced alternately, and the upper 16 bits and the lower 16 bits are logically exclusively ORed. Finally, the value of 16 bits produced in this manner is converted into an integer, and the integer is used as a hash value (output value of the Hash function).

It is to be noted that the replacement of the positions and the logical operation for the bit values of the input value are not limited to those described above, and various methods can be used in an arbitrary combination for them.

From the foregoing, it follows that the load equalization section provided in the source router is constructed so as to perform at least one of replacement of positions and logical operation for bit values of an input value as the calculation by the Hash function to produce a random integer value. This allows simplification of the hash calculation and also allows distribution of traffic flows to be performed at a high speed.

It is to be noted that, in order to augment the efficiency of the hash calculation described above, as an input value for the Hash function, a control value (for example, a protocol ID, a port number or the like) other than the address included in each packet or the like may be used in addition to the address (host address, destination address) included in the packet. In particular, the load equalization section provided in the source router is constructed so as to additionally use, as an input value for the Hash function, a control value other than the address included in each packet. This increases the disturbance degree of the output value by the hash calculation and allows efficient and effective distribution of traffic flows.

In the following, an example of load distribution of the present algorithm is described.

(A) CALCULATION EXAMPLE 1

If it is assumed that the logical bandwidths LBW [bit/s] of the paths 1, 2 and 3 are 10 M, 8 M and 2 M, respectively, and the effective loads $\rho$ effective are 0.5, 0.2 and 0.3, respectively, then the actual traffics [bit/s] of the paths 1, 2 and 3 are 10 M$\times$0.5=5 M, 8 M$\times$0.2=1.6 M, and 2 M$\times$0.3=0.6 M, respectively.

Further, if all paths in this instance are regarded as one virtual pipe, then an average utilization $\rho$ ave effective is determined in the following manner.

$\rho$ave effective=(5 M+1.6 M+0.6 M)/(10 M+8 M+2 M)=0.36

Then, if the effective bandwidth (EBW) [bit/s] to be moved is calculated for the paths 1, 2 and 3, then the following results are obtained.

In particular, the effective bandwidth $\Delta$EBW PATH1 to be moved of the path 1 is (0.36−0.5)$\times$10 M=−1.4 M; the effective bandwidth $\Delta$EBW PATH2 to be moved of the path 2 is (0.36−0.2)$\times$8 M=+1.28 M; and the effective bandwidth $\Delta$EBW PATH3 to be moved of the path 3 is (0.36−0.3)$\times$2 M=+0.12 M. Then, if the sum total of the effective bandwidths to be moved of all of the paths is calculated, then the result is −1.4 M+1.28 M+0.12 M=0.

Adjustment of the traffic share is performed based on the calculation result.

In particular, for the path 1, 5 M−1.4 M=3.6 M; for the path 2, 1.6 M+1.28 M=2.88 M; and for the path 3, 0.6 M+0.12 M=0.72 M. Consequently, for the paths 1, 2 and 3, the traffic share should be changed at the ratio of 3.6$\times$Gr: 2.88$\times$Gr: 1.2$\times$Gr.

(B) CALCULATION EXAMPLE 2

If it is assumed that the logical bandwidths LBW [bit/s] of the paths 1, 2, 3 and 4 are 150 M, 45 M, 150 M and 600 M, respectively, and further the effective loads $\rho$ effective are 1.2, 1.5, 1.1 and 0.8, respectively, then the actual traffics [bit/s] of the paths 1, 2, 3 and 4 are 150 M $\times$1.2=180 M, 45 M$\times$1.5=67.5 M, 150 M$\times$1.1=165 M, and 600 M$\times$0.8=480 M, respectively.

Further, if all paths are regarded as one virtual pipe, then an average utilization $\rho$ave effective is determined in the following manner.

$\rho$ ave effective=(180 M+67.5 M+165 M+480 M)/ (150 M+45 M+150 M+600 M)=892.5/945=0.94

Then, if the effective bandwidth (EBW) to be moved is calculated for all of the paths 1 to 4, then the following results are obtained.

In particular, the effective bandwidth ΔEBW PATH1 to be moved of the path 1 is (0.94−1.2)×150 M=−39 M; the effective bandwidth ΔEBW PATH2 to be moved of the path 2 is (0.94−1.5)×45 M=−25.2 M; the effective bandwidth ΔEBW PATH3 to be moved of the path 3 is (0.94−1.1)×150 M=−24 M, and the effective bandwidth ΔEBW PATH1 to be moved of the path 4 is (0.94−0.8)×600 M=84 M.

Adjustment of the traffic share is performed based on the calculation result.

In particular, for the path 1, 180 M−39 M=141 M; for the path 2, 67.5 M−25.2 M=42.3 M; for the path 3, 165 M−24 M=141 M; and for the path 4, 480 M+84 M−564 M. Consequently, for the paths 1, 2, 3 and 4, the traffic share should be changed at the ratio of 141×Gr: 42.3×Gr: 141×Gr: 564×Gr.

(2-5) Description of Operation

With such a construction as described above, if the MPLS router 11 is first connected to the network, then the routing protocol operates and performs discovery of the other MPLS routers connected to the network. For such discovery, usually a hello packet is used. If the topology of the network is cleared up by the routing protocol, then a link state database 113A is produced by the path selection section 113. LSPs are set between the MPLS router 11 and the other MPLS routers by the LSP setting section 115 through the LSP selection section 114 using the link state database 113A. Further, the LSP selection section 114 cooperates with the link state database 113A of the path selection section 113 to produce an alternate path information database 114A and thus produces a routing table unique to the MPLS and not used by any other conventional routing protocol. The alternate path information database 114A cooperates with the traffic engineering section 116 to set an alternative path using the LSPs as needed. In short, by setting a plurality of LSPs between the MPLS router 11 and an MPLS router at the end point, balancing of load can be performed between the LSPs.

It is to be noted that, while the series of functions regarding balancing of load are functions of the traffic engineering section 116, to the load observation section 116A of the traffic engineering section 116 having the construction just described, track characteristic values such as utilization and a packet loss number are sent from the IP packet transfer section 111. The load observation section 116A sends the values to the traffic characteristic value calculation section 116B. The traffic characteristic value calculation section 116B performs smoothing or maximization of the traffic characteristic values and transmits a resulting value to the other MPLS routers. On the other hand, traffic characteristic values sent to the MPLS router 11 from the other MPLS routers are collected by the traffic characteristic value calculation section 116B and sent to the traffic engineering calculation section 116C. The traffic engineering calculation section 116C performs calculation of effective loads and effective bandwidths and performs load adjustment in accordance with the bandwidths of the individual LSPs.

A result of the load adjustment is transmitted to the load adjustment section 116D, by which a width of the track share is determined. Then, a result of the determination is set by the IP packet transfer section 111 through the LSP setting section 115.

In this manner, each of the routers 11R and 11D other than the source MPLS router 11S collects traffic characteristics of transmission paths connected to the other routers and notifies the source router of the collected track characteristics. Meanwhile, the source MPLS router 11S collects traffic characteristics of transmission paths connected to the source router and calculates effective loads based on one or both of the thus collected traffic characteristics and traffic characteristics obtained from the other routers. Then, based on the effective load information, the source MPLS router 11S performs discrimination of whether or not a transmission path should be added or deleted and further performs equalization of the obtained effective load between a plurality of transmission paths. Consequently, each router has a traffic characteristic observation function and a traffic characteristic value notification function, and a router (source router) which serves as a start point of load distribution can dynamically perform bandwidth management of a plurality of paths to another router (destination router) which serves as an end point. As a result, load distribution in accordance with free bandwidths can be performed. In particular, since a plurality of routes (transmission paths) can be set from a router (source router) which serves as a start point to another router (destination router) which serves as an end point from among routers in an IP network and distribution of load can be performed among the set routes, traffic engineering can be achieved within the network such as the Internet irrespective of the network topology and without depending upon the type of the transmission paths.

(2-6) Examples of Experiment

Figure 14:
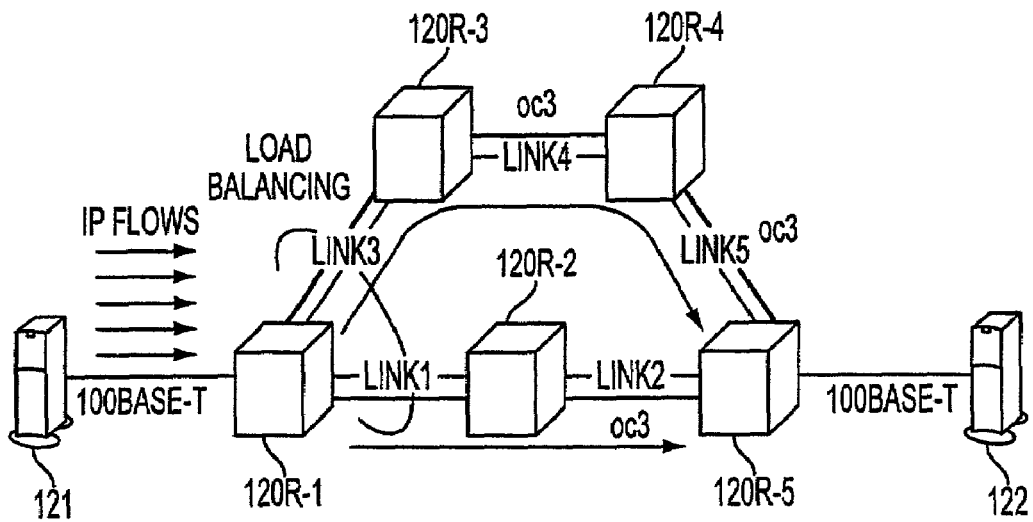
FIG. 14 is a view for explaining a view of a network for experiment of load adjustment.

Evaluation of the load distribution performance by the load distribution apparatus of the present invention was performed using a network construction for experiment shown in FIG. 14. It is to be noted that, in FIG. 14, LSR 120R-1 to 120R-5 denote each an LSR which includes the load distribution apparatus of the present invention, and a load generating apparatus 121 is connected to the LSR 120R-1 which serves as a source LSR while a load receiving apparatus 122 is connected to the LSR 120R-5 which serves as a load destination LSR. A plurality of links link1 to link5 are laid between the LSRs 120R-1 to 120R-5 such that they form a plurality of transmission paths 123-1 and 123-2. In other words, also the network construction for experiment shown in FIG. 14 can be considered as an example of the network construction of the MPLS shown in FIG. 7.

In order to confirm operation of the path search function by each of the LSRs 120R-1 to 120R-5, load distribution was performed using the network construction for experiment shown in FIG. 14, and the relationship between the traffic movement amount and the traffic convergence time with regard to the links link1 and link3 (which correspond to the entrances of the plurality of transmission paths 123-1 and 123-2, respectively) connected to the source LSR 120R-1 was evaluated as the load distribution performance by the load distribution apparatus of the present invention. Results of the evaluation are illustrated in FIGS. 15 and 16.

Figure 15:
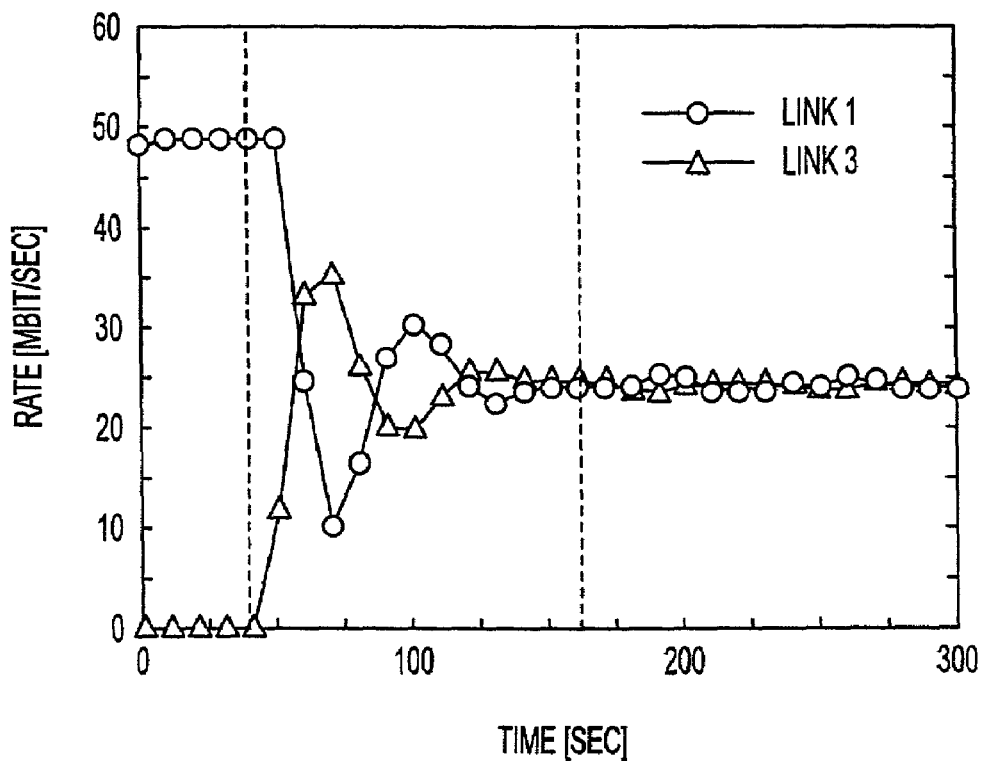
FIG. 15 is a view for explaining an example of a result of evaluation of a load adjustment performance.
Figure 16:
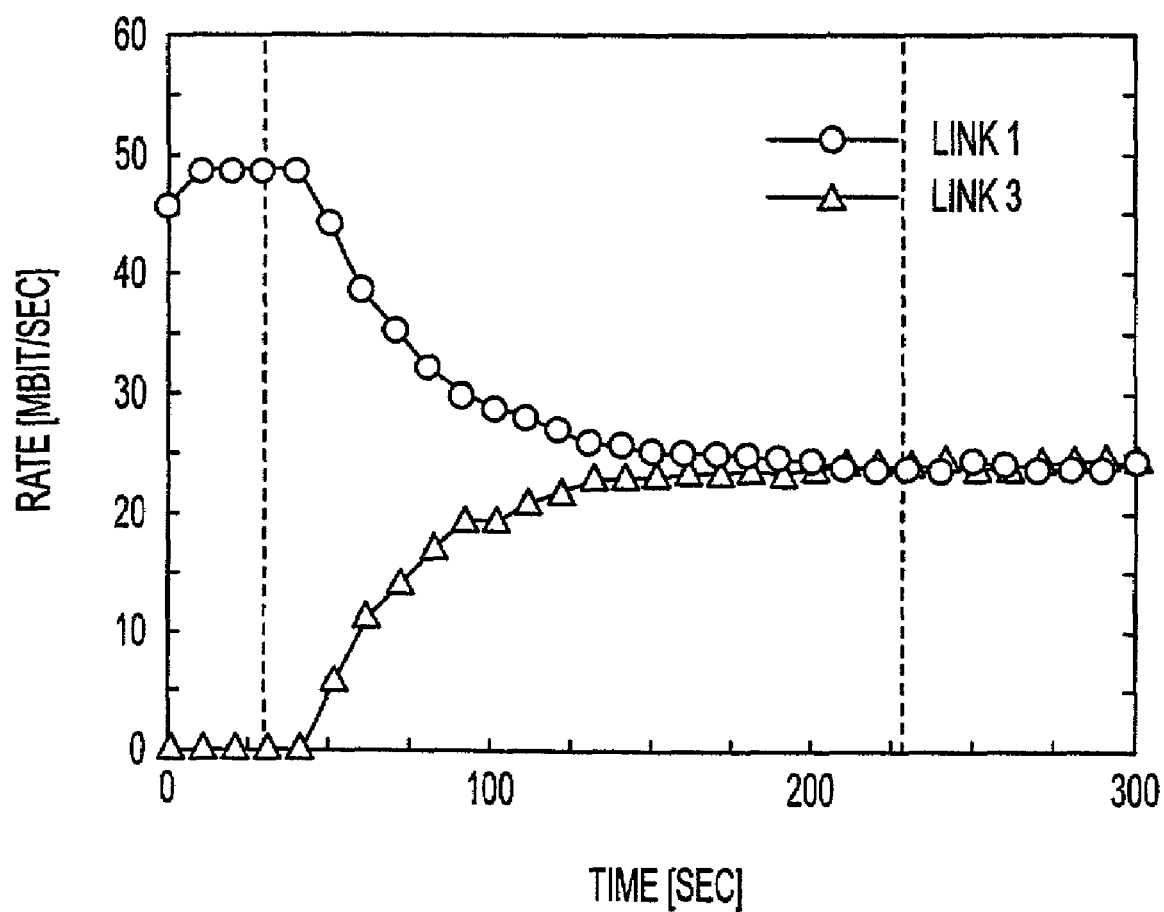
FIG. 16 is a view for explaining another example of a result of evaluation of a load adjustment performance.

In FIG. 15, variations in time of the link utilization of the links link1 and link2 when load distribution was performed in the conditions of the input traffic of 50 Mbit/sec (93 flows), the flooding interval (OPSF flooding interval) by the OSPF of 10 sec, the congestion threshold of 30 Mbit/sec and the Hash granularity of 100% and the link utilization were calculated after each 10 seconds are shown in graph.

Immediately after the experiment was started, the link utilization (indicated by a void circle in the graph) of the link link1 was a little lower than 50 Mbit/sec and higher than 30 Mbit/sec of the congestion discrimination threshold value, and congestion occurred. On the other hand, the link utilization (a void triangle) of the link link3 was almost 0

Mbit/sec, and it can be seen that one-sidedness of the load appeared between the two links link1 and link3.

The load distribution by the load distribution apparatus of the present invention was started at 40 seconds after the experiment was started. The link utilization of the link link1 decreased suddenly while the link utilization of the link link3 increased suddenly, and it can be seen that the load was distributed between the two links link1 and link3. Then, at 20 seconds after the load distribution was started (at 70 seconds after the experiment was started), the traffics of the two links link1 and link3 were turned and an over-controlled state was entered once. However, while oscillations were repeated, the difference became very small and the difference between the traffics of the two links link1 and link3 gradually converged. The convergence time of the traffics was 120 seconds after the load distribution was started.

On the other hand, in FIG. 16, the experiment was performed in the same conditions as those of FIG. 15 except that the Hash granularity was changed to 20%. As a result, although the convergence time of the traffics was 200 seconds after the load distribution was started and was longer than that of the result illustrated in FIG. 15, the traffics were not turned and an over-controlled state was not entered, but the difference between the traffics of the two links link1 and link3 converged asymptotically. Thus, it can be seen that distribution of the load was achieved in a stable state.

In particular, if the Hash granularity is set rather high, then although the traffics are rendered unstable through over-control, load distribution can be achieved in a short time. In contrast, if the Hash granularity is set rather low, then although the time required for load distribution becomes long, load distribution can be achieved in a stable state while preventing the traffics from being rendered unstable through over-control. In other words, appropriate setting of the Hash granularity in accordance with the state of the network or the performance of the hardware allows efficient load distribution.

(2-7) Others

It is to be noted that, while it is described in the embodiment described above that, using MPLS (Multi-Protocol Label Switching) and using a label function of the MPLS, a route different from a routing protocol is set to perform load distribution, the present invention can be applied even if some other technique is used wherein, using an ATM (Asynchronous Transfer Mode), an FR (Frame Relay) or the like and using a protocol unique to the layer 2, a route different from the layer 3 (IP) is set to perform load distribution, or using source routing in the IP, a route different from a path of a routing protocol is set to perform load distribution.

It is also to be noted that, while a router is used as an example of the communication apparatus in the embodiment described above, the present invention is not only applied to a router but is widely applicable to other kinds of communication apparatus such as a gateway.

Further, the present invention is not limited to the embodiment described hereinabove and can be carried out in various forms without departing from the spirit of the present invention.

(2-8) Addition

As described in detail above, according to the present invention, each communication apparatus has a traffic characteristic observation function and a traffic characteristic value notification functions and a communication apparatus (source communication apparatus) which serves as a start point of load distribution can paths to another communication apparatus (destination communication apparatus) which serves as an end point. As a result, load distribution in accordance with free bandwidths can be performed. In particular, since a plurality of routes (transmission paths) can be set from apparatus) which serves as a start point to another communication apparatus (destination communication apparatus) which serves as an end point from among of load can be performed among the set routes, traffic engineering can be achieved within the network such as the Internet irrespective of the network topology and without depending upon the type of the transmission paths.

The traffic characteristic collection section may characteristic values, and this can reduce an influence of a sudden traffic variation.

Further, the traffic characteristic collection section may determine utilization of the transmission paths connected to the communication apparatus based on the collected traffic characteristic values. This allows the utilization of the transmission paths to be grasped particularly. In this instance, where a smoothing unit is constructed so as to smooth the utilization determined by a utilization discriminating unit, the utilization of the transmission paths can be grasped accurately while eliminating an influence of the traffic variation. Also where the traffic characteristic collection section has determines utilization of the transmission paths connected to the communication apparatus based on the traffic characteristic values smoothed by the smoothing unit, a similar effect can be achieved.

Further, if the traffic characteristic collection section determines a maximum value of the collected traffic characteristic values as a representative value of the traffic characteristic values, then transmission path selection control can be performed with a degree of certainty.

Further, the traffic characteristic notification section may notify (provide) information regarding the traffic characteristics making use of a packet provided by a routing protocol, and according to this construction, an existing protocol can be utilized, and consequently, it is not necessary to newly prepare a routing protocol for exclusive use, which contributes to reduction of the cost so forth.

Furthermore, the traffic characteristic notification section may notify information regarding the traffic characteristics after each fixed period, and according to this construction, arithmetic load applied to an arithmetic unit such as a CPU which executes arithmetic operation and so forth can be reduced.

Further, the traffic characteristic notification section may notify information regarding the traffic characteristic with a message of the RSVP expanded, and according to this construct, an existing protocol can be utilized. Consequently, it is not necessary to newly prepare a routing protocol for exclusive use, which contributes to reduction of the cost and so forth.

Furthermore, the traffic characteristic collection section may collect a unit of a flux of flows for collecting traffic characteristics in a unit of a label which is used by a communication apparatus of the label switch type, and according this construction, traffic characteristics can be collected finely, which contributes to augmentation of the collection accuracy.

Further, the traffic characteristic collection section provided in the source communication apparatus may determine utilization of the transmission paths based on an average utilization of the transmission paths, and this can contribute to augmentation the efficiency in use of the network.

Furthermore, the traffic characteristic collection section provided in the source communication apparatus may determine utilization of each of the transmission paths based on a maximum utilization of the transmission paths, and according to this construction, transmission path selection control can be performed with certainty.

Further, the traffic characteristic collection section provided in the source communication apparatus may determine after each fixed period whether or not each of the transmission paths is congested, and according to this construction, arithmetic load applied to an arithmetic unit such as a CPU which executes arithmetic operation and so forth can be reduced.

Furthermore, the load calculation section provided in the source communication apparatus may calculate effective load taking a number of abandoned packets generated in the intermediate communication apparatus into consideration and according to this construction, even if a load is not directly measured, an effective load can be estimated by a simple method. In this instance, an upper limit to the effective load can be set, and according to this construction, load estimation of an excessive amount can be avoided, and as a result, appropriate transmission path selection control can he performed.

Further, the decision section provided in the source communication apparatus may calculate an effective bandwidth from the effective load obtained by an effective load calculation unit and determining, regarding all of the transmission paths as one virtual pipe, utilization of the virtual pipe, and according to this construction, it can be prevented to unnecessarily add a new transmission path and this can contribute also to effective utilization of the network.

Furthermore, the transmission path controlling apparatus may be constructed so as to determine whether a transmission path is to be added or deleted based on the information regarding the pipe utilization obtained by the calculation unit. This allows addition and deletion of a transmission path appropriately with the loads to the transmission paths at present taken into consideration, and distribution of the load can be achieved efficiently In this instance, an transmission path addition-deletion discrimination unit may be constructed so as to perform discrimination of whether or not a transmission path should be added or deleted based on at least one of the pipe utilization, rate of change and integrated amount obtained by the calculation means, an appropriate path can be selected in accordance with the situation of the network or the performance of the hardware.

Further, the decision section can be constructed so as to compare the pipe utilization, rate of change and integrated value obtained by the calculation unit with respective reference values and perform determination of whether or not a transmission path should be added or deleted in response to a result of the comparison, and according to this construction, up-to-date optimum path selection can be performed.

Furthermore, the calculation unit may be constructed so as to calculate a difference value between pipe utilization and/or a differential value of the pipe utilization as the rate of change of the pipe utilization or may be constructed so as to determine a number of times by which the pipe utilization exceeds a reference value or an integral value of the pipe utilization as the integrated amount of the pipe utilization. This allows the calculation amount to be changed in accordance with the situation of the network or the performance of the hardware and allows efficient path selection.

Further, the decision section may selecting a candidate of a transmission path as an object of deletion based on the load information determined by the load calculation section, estimating the load to the other transmission paths when the transmission path of the selected candidate of deletion selected is deleted, and comparing the estimated load to the other transmission paths with a predetermined reference value and determining whether or not the transmission path of the candidate of deletion should be deleted in response to a result of the comparison. This allows appropriate selection of a transmission path to be deleted taking an influence when any transmission path is deleted into consideration. In this instance, where the information regarding the pipe utilization obtained by the calculation unit is used as a trigger for the operation, a transmission path can be deleted efficiently in response to the situation of the entire network.

Further, the load equalization section provided in the source communication apparatus may have a move effective bandwidth calculation unit for determining an effective bandwidth to be moved with each of the transmission paths from an average effective bandwidth calculated for all of the transmission paths based on an effective bandwidth obtained from effective load obtained taking a number of abandoned packets generated in the intermediate communication apparatus into consideration, and according to this construction, equalization of load with bandwidths of transmission paths taken into consideration can be performed.

Furthermore, the load equalization section provided in the source communication apparatus may distribute packets flowing into the source communication apparatus to the plurality of transmission paths in proportion to the effective bandwidths to be moved calculated by the move effective band calculation unit, and according to this construction, precise equalization of load can be performed.

Further, the load equalization section provided in the source communication apparatus may be constructed so as to perform a calculation using a Hash function based on an address and distribute traffic flows at random based on a result of the calculation, and according to this construction, traffic flows can be distributed precisely by simple calculation.

In this instance, the load equalization section may be constructed so as to perform the calculation using a CRC (cyclic redundancy check) as the Hash function or perform calculation to produce a random integer value by replacement of bit positions of an input value as the Hash function or the load equalization section may be constructed so as to additionally use a control value other than the address included in each packet as an input value for the Hash function. This allows efficient and effective distribution of traffic flows to be performed.

What is claimed is:

1. A transmission path controlling apparatus for use with an Internet protocol network which includes a source communication apparatus, a destination communication apparatus, a plurality of transmission paths capable of being set between said source communication apparatus and said destination communication apparatus, and at least one intermediate communication apparatus each interposed in any one of said transmission paths, said transmission path controlling apparatus being provided in one of said communication apparatus, comprising:

a traffic characteristic collection section for collecting traffic characteristics of those of said transmission paths connected to the one communication apparatus or the other communication apparatus, a traffic characteristic notification section for notifying the other communication apparatus of the traffic characteristics collected by said traffic characteristic collection section, a load calculation section for calculating load based on the traffic characteristics collected by said traffic characteristic collection section, a decision section for deciding whether or not a transmission path should be added or deleted based on the load information determined by said load calculation section, and a load equalization section for equalizing the load determined by said load calculation section among said plurality of transmission paths based on the decision of said decision section.

2. A transmission path controlling apparatus for use with an Internet protocol network which includes a source communication apparatus, a destination communication apparatus, a plurality of transmission paths capable of being set between said source communication apparatus and said destination communication apparatus, and at least one intermediate communication apparatus each interposed in any one of said transmission paths, said transmission path controlling apparatus being provided in said source communication apparatus, comprising:

a traffic characteristic collection section for collecting traffic characteristics of those of said transmission paths connected to said source communication apparatus or the other communication apparatus, a load calculation section for calculating load based on the traffic characteristics collected by said traffic characteristic collection section, a decision section for deciding addition or deletion of a transmission path based on the load information determined by said load calculation section, and a load equalization section for equalizing the load determined by said load calculation section among said plurality of transmission paths based on the decision of said decision section.

3. The transmission path controlling apparatus of claim 1, further comprising:

in said traffic characteristic collection section, means for smoothing the collected traffic characteristic values.

4. The transmission path controlling apparatus of claim 3, further comprising:

in said traffic characteristic collection section, means for calculating utilization of the transmission paths connected to the communication apparatus based on the collected traffic characteristic values.

5. The transmission path controlling apparatus of claim 4, wherein said smoothing means of said traffic characteristic collection section is constructed so as to smooth the utilization calculated by said utilization calculating means.

6. The transmission path controlling apparatus of claim 3, wherein said smoothing means of said traffic characteristic collection section is constructed so as to smooth the collected traffic characteristic values, and said traffic characteristic collection section has means for calculating utilization of the transmission paths connected to the communication apparatus based on the traffic characteristic values smoothed by said smoothing means.

7. The transmission path controlling apparatus of claim 1, further comprising:

in said traffic characteristic collection section, means for determining a maximum value of the collected traffic characteristic values as a representative value of the traffic characteristic values.

8. The transmission path controlling apparatus of claim 1, further comprising:

in said traffic characteristic notification section, means for notifying of information regarding the traffic characteristics making use of a packet provided by a routing protocol.

9. The transmission path controlling apparatus of claim 1, further comprising:

in said traffic characteristic notification section, means for notifying of information regarding the traffic characteristics at periodical intervals.

10. The transmission path controlling apparatus of claim 1, further comprising:

in said traffic characteristic notification section, means for notifying of information regarding the traffic characteristic with a message of the RSVP expanded.

11. The transmission path controlling apparatus of claim 1, further comprising:

in said traffic characteristic collection section, means for collecting a unit of a flux of flows for collecting traffic characteristics which is used by a communication apparatus of the label switch type.

12. The transmission path controlling apparatus of claim 1, further comprising:

in said traffic characteristic collection section provided in said source communication apparatus, means for calculating a utilization of each of the transmission paths connected to said source communication apparatus based on an average utilization of the transmission paths connected to said intermediate communication apparatus collected from said intermediate communication apparatus.

13. The transmission path controlling apparatus of claim 12, further comprising:

in said traffic characteristic collection section provided in said source communication apparatus, means for calculating a utilization of each of the transmission paths connected to said source communication apparatus based on urn utilization of the transmission paths connected to said intermediate communication apparatus collected from said intermediate communication apparatus.

14. The transmission path controlling apparatus of 1, further comprising:

in said traffic characteristic collection section provided in said source communication apparatus, means for discriminating at periodical intervals whether or not each of said transmission paths is congested.

15. The transmission path controlling apparatus of claim 1, further comprising:

in said load calculation section provided in said source communication apparatus, means for calculating effective load taking a number of abandoned packets generated in said intermediate communication apparatus into consideration.

16. The transmission path controlling apparatus of claim 15, wherein said effective load calculation means is constructed so as to set an upper limit to the effective load when the effective load is to be calculated.

17. The transmission path controlling apparatus of claim 1, further comprising:

in said load calculation section provided in said a source communication apparatus, means for calculating load taking a number of abandoned packages in said intermediate communication apparatus consideration, and said decision section provided in said source communication apparatus has means for calculating an effective bandwidth from the effective load obtained by said effective load calculation means and for determining, regarding all of said transmission paths as one virtual pipe, a utilization of the virtual pipe.

18. The transmission path controlling apparatus of claim 1, further comprising:
in said load calculation section provided in said source communication apparatus, means for calculating effective load taking a number of abandoned packages generated in said intermediate communication apparatus into consideration, and
said decision section provided in said source communication apparatus having pipe utilization calculation means for calculating an effective bandwidth from the effective load calculated by said effective load calculation means and for determining, regarding all of said transmission paths as one virtual pipe, a utilization of the virtual pipe, and
means for comparing the pipe utilization obtained by said pipe utilization calculation means with a set reference value and for deciding whether a transmission effective generated path is to be added or deleted in accordance with a result of the comparison.

19. The transmission path controlling apparatus of claim 18, wherein
said calculation means of said decision section is constructed so as to calculate at least one of the pipe utilization, a rate of change of the pipe utilization per time and an integrated amount of the pipe utilization in a fixed time, and
said transmission path addition-deletion decision means is constructed so as to perform decision of whether or not a transmission path should be added or deleted based on at least one of the pipe utilization, rate of change and integrated amount obtained by said calculation means.

20. The transmission path controlling apparatus of claim 19, wherein said decision section provided in said source communication apparatus is constructed so as to perform comparison of at least one of a set of the pipe utilization obtained by said calculation means and a first reference value, another set of the rate of change obtained by said calculation means and a second reference value and a further set of the integrated value obtained by said calculation means and a third reference value, and perform decision of whether or not a transmission path should be added or deleted in response to a result of the comparison.

21. The transmission path controlling apparatus of claim 20, wherein said decision section provided in said source communication apparatus is constructed so as to add a transmission path when the pipe utilization obtained by said pipe utilization calculation means is higher than a reference value for addition of a path.

22. The transmission path controlling apparatus of claim 20, wherein said decision section provided in said source communication apparatus is constructed so as to delete a transmission path having a low load when the pipe utilization obtained by said pipe utilization calculation means is lower than a reference value for deletion of a path.

23. The transmission path controlling apparatus of claim 18, wherein said calculation means is constructed so as to calculate at least one of a difference value between two pipe utilizations obtained after a very small interval and a differential value of the pipe utilization at a certain point of time as the rate of change of the pipe utilization per time.

24. The transmission path controlling apparatus of claim 18, wherein said calculation means is constructed so as to calculate at least one of a number of times by which the pipe utilization exceeds a certain reference value within a fixed period of time and an integral value of the pipe utilization within the fixed time as the integrated amount of the pipe utilization within the fixed period of time.

25. The transmission path controlling apparatus of claim 1, wherein
said decision section provided in said source communication apparatus includes means for selecting a candidate of a transmission path as an object of deletion based on the load information determined by said load calculation section,
means for estimating the load to the other transmission paths when the transmission path of the candidate of deletion selected by said deletion candidate selection means is deleted, and
means for comparing the load to the other transmission paths estimated by said load estimation means with a predetermined reference value and determining whether or not the transmission path of the candidate of deletion should be deleted in response to a result of the comparison.

26. The transmission path controlling apparatus of claim 25, further comprising:
in said load calculation section provided in said source communication apparatus, means for calculating an effective load taking a number of abandoned packets generated in said intermediate communication apparatus into consideration, and
said decision section provided in said source communication apparatus further includes
calculation means for calculating an effective bandwidth from the effective load obtained by said effective load calculation means and determining, regarding all of said transmission paths as one virtual pipe, information regarding utilization of the virtual pipe, and
trigger means for triggering said selection means, estimation means and determination means to operate based on the information regarding the pipe utilization obtained by said calculation means.

27. The transmission path controlling apparatus of claim 1, further comprising:
in said load equalization section provided in said source communication apparatus, move effective bandwidth calculation means for determining an effective bandwidth to be moved with each of said transmission paths from an average effective bandwidth calculated for all of said transmissions paths based on an effective bandwidth obtained from effective load obtained taking a number of abandoned packets generated in said intermediate communication apparatus into consideration.

28. The transmission path controlling apparatus of claim 27, further comprising:
in said load equalization section provided in said source communication apparatus, means for distributing packets flowing into said source communication apparatus to said plurality of transmission paths in proportion to the effective bandwidths to be moved calculated by said move effective band calculation means.

29. The transmission path controlling apparatus of claim 28, wherein said load equalization section provided in said source communication apparatus is constructed so as to perform a calculation using a Hash function based on an address and distribute traffic flows at random based on a result of the calculation.

30. The transmission path controlling apparatus of claim 29, wherein said load equalization section provided in said source communication apparatus performs the calculation using a CRC (cyclic redundancy check) as the Hash function.

31. The transmission path controlling apparatus of claim 29, wherein said load equalization section provided in said source communication apparatus performs at least one of replacement of positions and logical operation for bit values of an input value as the calculation by the Hash function to produce a random integer value.

32. The transmission path controlling apparatus of claim 29, wherein said load equalization section provided in said source communication apparatus additionally uses, as an input value for the Hash function, a control value other than the address included in each packet.

33. A transmission path controlling method for an Internet protocol network which includes a source communication apparatus, a destination communication apparatus, a plurality of transmission paths capable of being set between said source communication apparatus and said destination communication apparatus, and at least one intermediate communication apparatus each interposed in any one of said transmission paths, the method comprising:
  (a) collecting traffic characteristics of those of said transmission paths connected to other communication apparatus, and
  (b) notifying said source communication apparatus of the traffic characteristics collected by step (a), steps (a) and (b) being performed by a communication apparatus other than said source communication apparatus of said Internet protocol network, and
  (c) collecting traffic characteristics of those of said transmission paths connected to said source communication apparatus,
  (d) calculating load based on one or both of the traffic characteristics collected by the traffic characteristic collection step and the traffic characteristics obtained from the other communication apparatus,
  (e) deciding whether or not a transmission path should be added or deleted based on the load information determined by the load calculation step, and
  (f) equalizing the load determined by the load calculation step among said plurality of transmission paths based on the decision of said step (e),
  steps (d), (e), and (f) being performed by said source communication apparatus.

34. A medium on which a transmission path controlling program for use with an Internet protocol network which includes a source communication apparatus, a destination communication apparatus, a plurality of transmission paths capable of being set between said source communication apparatus and said destination communication apparatus, and at least one intermediate communication apparatus each interposed in any one of said transmission paths is recorded, said transmission path controlling program being used by one of said communication apparatus, said transmission path controlling program causing a computer to function as
  traffic characteristic collection means for collecting traffic characteristics of those of said transmission paths connected to the communication apparatus or the other communication apparatus, traffic characteristic notification means for
  the other communication apparatus of the traffic characteristics collected by said traffic characteristic collection means,
  load calculation means for calculating load based on the traffic characteristics collected by said traffic characteristic collection means,
  decision means for deciding whether or not a transmission path should be added or deleted based on the load information determined by said load calculation means, and
  load equalization means for equalizing the load determined by said load calculation means among said plurality of transmission paths based on the decision of said decision means.

35. A network load balancing apparatus which balances the traffic load among transmission paths set between an ingress node and an egress node in a network having a plurality of network nodes, said network having a plurality of transmission paths capable of being set said ingress node and said egress node, comprising:
  a traffic characteristic collection section for determining traffic characteristics of said transmission paths set between said ingress node and said egress node,
  a traffic characteristic notification section for notifying network nodes of results of said traffic characteristic collection section,
  a load calculation section for calculating an effective traffic load based on an occupation of a link and a packet loss number at the link, both of which are included in the traffic characteristics collected by said traffic characteristic collection section, and
  a means for causing transmission of a packet on a transmission path set between said ingress node and said egress node depending upon said traffic load calculation.

36. The network load balancing apparatus of claim 35, further comprising:
  a decision section for deciding whether or not a transmission path should be added or deleted between said ingress node and said egress node based on the traffic load information determined by said load calculation section.

37. The network load balancing apparatus of claim 35, further comprising:
  a load equalization section for equalizing the load determined by said load calculation section among said set transmission paths.

38. The network load balancing apparatus of claim 35, further comprising:
  means in said in traffic characteristic notification section for providing said results of the information regarding the traffic characteristics periodically and by making use of a packet provided by a routing protocol.

39. The network load balancing apparatus of claim 35, wherein
  said traffic characteristic collection section calculates utilization of the set transmission paths based on the collected traffic characteristic values.

40. The network load balancing apparatus of claim 39, wherein
  said traffic characteristic collection section smoothes the calculated utilization of the set transmission paths.

41. The network load balancing apparatus of claim 39, wherein
  said traffic characteristic collection section smoothes the collected traffic characteristic values, and said traffic characteristic collection section calculates utilization of the set transmission paths based on the smoothed collected traffic characteristic values.

42. The network load balancing apparatus of claim 35, further comprising:
  means in said in traffic characteristic notification section for collecting a unit of flux of flows for thereby collecting traffic characteristics in a unit of a label utilized by a router of a label switch type.

43. A network load balancing apparatus which balances the traffic load among transmission links which link node devices in a network, and where at least one transmission link defines a transmission path between an ingress node and an egress node, and said network having a plurality of transmission paths capable of being set between said ingress node and said egress node, comprising:
a traffic characteristic collection section for collecting traffic characteristics of said transmission links being portions of transmission paths set between said ingress node and said egress node,
a traffic characteristic notification section for providing results of said traffic characteristic collection section,
a load calculation section for calculating an effective traffic load based on an occupation of the link and a packet loss number at the link, both of which are included in the traffic characteristics collected by said traffic characteristic collection section, and
a means for causing transmission of a packet on a transmission path set between said ingress node and said egress node depending upon said traffic load calculation.

44. The network load balancing apparatus of claim 43, further comprising:
a decision section for deciding whether or not a transmission path should be added or deleted between said ingress node and said egress node based on the load information determined by said load calculation section.

45. The network load balancing apparatus of claim 43, further comprising:
a load equalization section for equalizing the load determined by said load calculation section among said set transmission paths.

46. The network load balancing apparatus 43, further comprising:
a means provided in said traffic characteristic collection section for calculating a utilization of each transmission path among said set transmission paths based on an average utilization of transmission links comprising said each transmission path.

47. The network load balancing apparatus of claim 43, further comprising:
a means provided in said traffic characteristic collection section for calculating a utilization of each transmission path among said set transmission paths based on a maximum utilization of transmission links comprising said each transmission path.

48. A transmission path controlling apparatus for use with an Internet protocol network which includes a source router, a destination router, a plurality of transmission paths capable of being set between said source router and said destination router, said Internet protocol network having at plurality of network devices including said source and destination routers, said transmission path controlling apparatus comprising:
a traffic characteristic collection section for collecting traffic characteristics of those of said transmission paths set between said source router and said destination router,
a traffic characteristic notification section for notifying network devices of results from said traffic characteristic collection section,
a load calculation section for calculating an effective load based on an occupation of a link and a packet loss number at the link, both of which are included in the traffic characteristics collected by said traffic characteristic collection section, and
a means for causing transmission of a packet on a transmission path set between said source router and said destination router depending upon said traffic load calculation.

49. The transmission path controlling apparatus of claim 48, further comprising:
a decision section for deciding whether or not a transmission path should be added or deleted based on the load determined by said load calculation section.

50. The transmission path controlling apparatus of claim 48, further comprising:
a load equalization section for equalizing the load determined by said load calculation section among said set transmission paths.

51. The transmission path controlling apparatus of claim 48, further comprising:
means for smoothing the collected traffic characteristics.

52. The transmission path controlling apparatus of claim 51, wherein said traffic characteristic collection section calculates the utilization of those of said transmission paths set between said source roister and said destination roister based on the smoothed traffic characteristics.

53. The transmission path controlling apparatus of claim 48, further comprising:
means for determining a maximum value of the collected traffic characteristics as a representative value of the traffic characteristic values.

54. The transmission path controlling apparatus of claim 48, further comprising:
means for periodically notifying information regarding the traffic characteristics making use of a packet provided by a routing protocol.

55. The transmission path controlling apparatus of claim 48, further comprising:
means for notifying information regarding the traffic characteristic with a message of RSVP expanded protocol.

56. The transmission path controlling apparatus of claim 48, further comprising:
means for collecting a unit of a flux of flows thereby collecting traffic characteristics in a unit of a label which is used by a router of a label switch type.

57. The transmission path controlling apparatus of 48, further comprising:
means for calculating utilization of each transmission path connected to said source router based on an average utilization of the transmission paths connected
to a intermediate router collected from said intermediate router, wherein said intermediate router may be interposed in any one of said transmission paths.

58. The transmission path controlling apparatus of claim 48, further comprising:
means for calculating utilization of each of the transmission paths connected to said source router based on a maximum utilization of the transmission paths connected to a intermediate router collected from said intermediate router, wherein said intermediate router may be interposed in any one of said transmission paths.

59. The transmission path controlling apparatus of claim 48, further comprising:
means for determining periodically whether or not each of said transmission paths is congested.

60. The transmission path controlling apparatus of claim 48, further comprising:
  means provided in said load calculation section for calculating effective load taking a number of abandoned packets generated in an intermediate router into consideration, wherein said intermediate router may be interposed in any one of said transmission paths.

61. The transmission path controlling apparatus of claim 60, wherein
  said means is constructed so as to set an upper limit to the effective load when the effective load is to be calculated.

62. The transmission path controlling apparatus of claim 49, further comprising:
  means provided in said load calculation section for calculating effective load taking a number of abandoned packages generated in a intermediate router into consideration, and
  means provided in said decision section for calculating an effective bandwidth from the effective load obtained by said effective load calculation means and determining, regarding all of said transmission paths as one virtual pipe, a utilization of the virtual pipe.

63. The transmission path controlling apparatus of claim 49, further comprising:
  means for calculating effective load by considering a number of abandoned packages generated in a intermediate router, and
  said decision section having a pipe utilization calculation unit for calculating an effective bandwidth from the effective load calculated by said effective load calculation means and determining, regarding all of said transmission paths as one virtual pipe, a utilization of the virtual pipe, and
  means for comparing the pipe utilization obtained by said pipe utilization calculation unit with a set reference value and determining whether a transmission path is to be accordance with a result of the added or deleted comparison.

64. The transmission path controlling apparatus of claim 63, wherein said decision section is constructed so as to add a transmission path when the pipe utilization calculation obtained by said pipe utilization calculation unit is higher than a reference value for addition of a path.

65. The transmission path controlling apparatus of claim 63, wherein said decision section is constructed so as to delete a transmission path having a low load when the pipe utilization obtained by said pipe utilization calculation unit is lower than a reference value for deletion of a path.

66. The transmission path controlling apparatus of claim 50, further comprising:
  means for determining an effective bandwidth to be moved among each of said transmission paths from an average effective bandwidth calculated for all of said transmission paths based on an effective bandwidth obtained from effective load obtained taking a number of abandoned packets generated in a intermediate router into consideration.

67. The transmission path controlling apparatus of claim 66, further comprising:
  means for distributing packets flowing into said source router to said plurality of transmission paths in proportion to the effective bandwidths to be moved calculated by said move effective band calculation means.

68. The transmission path controlling apparatus of claim 67, wherein said load equalization section performs a calculation using a hash function based on an address and distributes traffic flows at random based on a result of the calculation.

69. A transmission path controlling method for a network which includes a source router, a destination router, and a plurality of transmission paths capable of being set between said source router and said destination router, comprising the steps of:
  collecting traffic characteristics of transmission paths set between said source router and said destination router,
  calculating an effective load of transmission paths set between said source router and said destination router based on an occupation of a link and a packet loss number at the link, both of which are included in results of the traffic characteristics collection step, and
  transmitting a packet on a transmission path set between said source router and said destination router depending upon said traffic load calculation.

70. The transmission path controlling method of claim 69, further comprising the step of:
  determining whether or not a transmission path should be added or deleted based on the load information determined by the load calculation step.

71. The transmission path controlling method of claim 69, further comprising the step of:
  equalizing the load determined by the load calculation step among said plurality of transmission paths.

72. The transmission path controlling method of claim 69, further comprising the step of:
  providing the results of the traffic characteristic collection step to node devices of the network.

73. A computer-readable medium having computer executable instructions for use in an internet protocol network which includes a source router, a destination router, a plurality of transmission paths capable of being set between said source router and said destination router, said computer executable instructions being used by a router, and for performing the steps comprising:
  collecting traffic characteristics of transmission paths set between said source router and said destination router,
  notifying other routers of the traffic characteristics collected,
  calculating an effective load based on an occupation of a link and a packet loss number at the link, both of which are included in the traffic characteristics collected, and
  transmitting a packet based on the results of the calculated load.

74. A computer-readable medium having computer executable instructions for use in an internet protocol network which includes a source router, a destination router, a plurality of transmission paths capable of being set between said source router and said destination router, said computer executable instructions being used by a router, and for performing the steps comprising:
  collecting traffic characteristics of transmission paths set between said source router and said destination router,
  notifying other routers of the traffic characteristics collected,
  determining whether or not a transmission path should be added or deleted based on the load information determined by said load calculation means, and
  load equalization means for equalizing the load determined by said load calculation means among said plurality of transmission paths based on the determination of said step of determining.

75. A label switch router in a Multi-Protocol Label Switch network, comprising:
- a traffic characteristic collection section for collecting for each port thereof, traffic characteristic values including an output packet amount from an output port and a logical bandwidth of said output port as traffic characteristic values;
- a traffic characteristic notification section for notifying network nodes of results from said traffic characteristics collection section; and
- means for processing the obtained traffic characteristic values by calculating a transmission line utilization value CUTY from the obtained traffic characteristic values in accordance with the following expression $CUTY$=output packet amount from an output port/
logical bandwidth of said output port.

76. A label switch router further in a Multi-Protocol Label Switch network, comprising:
- a traffic characteristic collection section for collecting for each port thereof, traffic characteristic values including an output packet amount from an output port and a logical bandwidth of said output port as traffic characteristic values;
- a traffic characteristic notification section for notifying network nodes of results from said traffic characteristics collection section; and
- means for processing the obtained traffic characteristic values by performing smoothing of the collected traffic characteristic values.

77. The label switch router of claim 76, wherein said smoothing processing is performed by calculating a value MUTY each time an observation value is obtained, wherein $MUTY = \alpha \times CUTY + (1-\alpha) \times MUTY$ where $\alpha$ is a smoothing coefficient.

78. The label switch router of claim 77, further comprising:
- means for determining a maximum value of collected characteristic values as a representative value of the traffic characteristic values, wherein the maximum value of the observation values is placed as a working value MUTY.

79. The label switch router of claim 78, wherein said traffic characteristic notification section distributes said traffic characteristic values including MUTY periodically utilizing a routing protocol.

80. A label switch router in a Multi-Protocol Label Switch network, comprising:
- a traffic characteristic collection section for collecting for each port thereof, traffic characteristic values including an output packet amount from an output port and a logical bandwidth of said output port as traffic characteristic values;
- a traffic characteristic notification section for notifying network nodes of results from said traffic characteristics collection section;
- wherein said traffic characteristic values including an abandoned packet number NLOSS at said output port in a time period, said label switch router including:
- means for processing the obtained traffic characteristic values by calculating a total number TLOSS of abandoned packets in accordance with the following expression $TLOSS(n) = TLOSS(n-1) + NLOSS$ where TLOSS(n) is the total number of abandoned packets during time period n, TLOSS(n−1) is the total number of abandoned packets in a prior time period.

81. The label switch router of claim 80, wherein said traffic characteristic notification section distributes said traffic characteristic values including TLOSS(n) periodically utilizing a routing protocol.

82. The label switch router of claim 81, wherein said distribution utilizes a message of an RSVP expanded protocol to notify another label switch router of the information.

83. The label switch router of claim 77, further comprising:
- a traffic characteristic collection section for receiving traffic characteristics from another label switch router,
- a load calculation section for calculating traffic load based on at least one of traffic characteristics collected from said traffic characteristic collection section and received traffic characteristics from another label switch roister, and
- a packet transfer section for transferring a packet based on the results of said load calculation section.

84. The label switch router of claim 83, wherein said load calculation section further calculates a congestion state of individual paths from said label switch router to another label switch router where a plurality of paths are set between said label switch router to said another label switch router, and each path may extend through a plurality of intermediate label switch routers and said path is composed of links between said intermediate label switch routers, said links connecting said intermediate label switch routers to form said path, the congestion state for each path is determined, from a utilization of each path, collected from each of said intermediate label switch roisters of each path, based on an average utilization of each link connected to each intermediate label switch router.

85. The label switch router of claim 84, wherein the utilization of a link j of a path i are averaged and may represented in such an expression as $\rho$ path $i$=Average($MUTY$(link $j$, path $i$).

86. The label switch router of claim 85, wherein
a maximum utilization of each link connected to each intermediate label switch router is calculated where a maximum value of utilization of all links of a path i is adopted and may be represented in the expression path $i$=Max($MUTY$(link $j$, path $i$).

87. The label switch router of claim 80, further comprising:
- a traffic characteristic collection receiving traffic characteristics from another label sect for switch router,
- a load calculation section for calculating traffic load based on at least one of traffic characteristics collected from said traffic characteristic collection section and received traffic characteristics from another label switch router, and
- a packet transfer section for transferring a packet based on the results of said load calculation section.

88. The label switch router of claim 87, wherein a plurality of paths are set between said label switch router to another label switch router, and each route extends through a plurality of intermediate label switch routers and is composed of links between said intermediate label switch routers, the congestion state for each route is determined from a utilization of each path, collected from each of said intermediate label switch routers of each path, based on an average utilization of each link connected to each intermediate label switch router.

89. The label switch router of claim 88, wherein a sum total TLOSS path i of abandoned packets of said path i is determined by the expression $$TLOSS \text{ path } i = \Sigma TLOSS \text{ link } j$$

where i is the number of a label switch path and j is a link number.

90. The label switch router of claim 89, wherein calculation of an effective load ρ effective of path i is calculated by the expression $$\rho \text{ effective path } i = \rho \text{ path } i \times f(TLOSS \text{ path } i)$$

where ρ path i is the load of path i and f(TLOSS path i) is a function regarding TLOSS path i.

91. The label switch router of claim 90, wherein if packet loss occurs, then the load ρ path i is corrected with a predetermined function f(TLOSS path i) according to the expression $$\rho \text{ effective path } i = \text{Min}(\rho \text{ effective path } i, \rho \text{ ceiling})$$

where f(TLOSS path i) is a function regarding TLOSS path i, and ρ ceiling is an upper limit load value to the effective load ρ effective path i.

92. The label switch router of claim 89, wherein each route extends through a plurality of intermediate label switch roisters, load based on traffic characteristics may be calculated utilizing a number MOSS path i of abandoned packets generated in each intermediate label switch router, the effective load ρ effective path i in accordance with effective load to ith path=load to ith path×f(abandoned packet number)

where f(abandoned packet number) is a function wherein the abandoned packet number is a variable.

93. The label switch router of claim 89, further comprising:
a load equalization section for adjusting the load periodically where all paths are regarded as a single virtual pipe, and a load to said virtual pipe is determined
by means for calculating effective bandwidths from effective loads obtained by said effective load calculation section and determining a utilization of the virtual pipe.

94. The label switch router of claim 93, wherein said utilization of the virtual pipe is determined in accordance with the expression utilization ρ effective all when all paths are regarded as one virtual pipe=Σ(ρ effective path $i \times LBW$ path $i$)/Σ$LBW$ path $i$ where ρ effective path is the effective load of the path i, and LBW path i is the logical bandwidth of the path.

95. The label switch router of claim 94, wherein said utilization of the virtual pipe is compared with a set reference value ρ offer1, and when the obtained value of the utilization is higher than ρ offer1, a new transmission path is added.

96. The label switch router of claim 94, wherein said utilization of the virtual pipe is compared with a set reference value ρ offer2, and if the obtained value of the utilization is lower than ρ offer2, then a path is deleted.

97. A transmission path controlling method for an internet protocol network which includes a source router, a destination router, a plurality of transmission paths capable of being set between said source router and said destination router, and a repeating router interposed in any one of said transmission paths, comprising the steps of:
collecting traffic characteristics of transmission paths connected to the repeating router and the destination router,
notifying said source router of the results of the traffic characteristics collection step,
calculating an effective load based on an occupation of a link and a packet loss number at the link, both of which are included in the traffic characteristics, and
transmitting a packet based on the results of the calculated load.

98. A transmission path controlling method for an internet protocol network which includes a source router, a destination router, a plurality of transmission paths capable of being set between said source router and said destination router, and a repeating router interposed in any one of said transmission paths, comprising the steps of:
collecting traffic characteristics of transmission paths connected to the repeating router and the destination router,
notifying said source router of the results of the traffic characteristics collection step;
determining whether or not a transmission path should be added or deleted based on the load information determined by the step of load calculation, and
equalizing a load among said plurality of transmission paths based on the determination of said step of determining.

* * * * *